US008597142B2

(12) United States Patent
Mayles et al.

(10) Patent No.: US 8,597,142 B2
(45) Date of Patent: Dec. 3, 2013

(54) DYNAMIC CAMERA BASED PRACTICE MODE

(75) Inventors: Gregg Mayles, Stretton en le Field (GB); Andrew Preston, Sileby (GB); Matthew South, Measham (GB); Andrew Fenwick, Ashby de la Zouch (GB)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 13/231,745

(22) Filed: Sep. 13, 2011

(65) Prior Publication Data

US 2012/0309477 A1  Dec. 6, 2012

Related U.S. Application Data

(60) Provisional application No. 61/493,684, filed on Jun. 6, 2011.

(51) Int. Cl.
*A63B 69/36* (2006.01)

(52) U.S. Cl.
USPC .......................................... 473/407; 473/226

(58) Field of Classification Search
USPC ........ 473/228, 407, 266; 702/155; 463/21–43
See application file for complete search history.

(56) References Cited

U.S. PATENT DOCUMENTS

| | | |
|---|---|---|
| 4,627,620 A | 12/1986 | Yang |
| 4,630,910 A | 12/1986 | Ross et al. |
| 4,645,458 A | 2/1987 | Williams |
| 4,695,953 A | 9/1987 | Blair et al. |
| 4,702,475 A | 10/1987 | Elstein et al. |
| 4,711,543 A | 12/1987 | Blair et al. |
| 4,751,642 A | 6/1988 | Silva et al. |
| 4,796,997 A | 1/1989 | Svetkoff et al. |
| 4,809,065 A | 2/1989 | Harris et al. |
| 4,817,950 A | 4/1989 | Goo |
| 4,843,568 A | 6/1989 | Krueger et al. |
| 4,893,183 A | 1/1990 | Nayar |
| 4,901,362 A | 2/1990 | Terzian |
| 4,925,189 A | 5/1990 | Braeunig |
| 4,991,850 A | 2/1991 | Wilhlem |
| 5,101,444 A | 3/1992 | Wilson et al. |

(Continued)

FOREIGN PATENT DOCUMENTS

| | | |
|---|---|---|
| CN | 101254344 B | 6/2010 |
| EP | 0583061 A2 | 2/1994 |

(Continued)

OTHER PUBLICATIONS

Kanade et al., "A Stereo Machine for Video-rate Dense Depth Mapping and Its New Applications", IEEE Computer Society Conference on Computer Vision and Pattern Recognition, 1996, pp. 196-202, The Robotics Institute, Carnegie Mellon University, Pittsburgh, PA.

(Continued)

*Primary Examiner* — Masud Ahmed
(74) *Attorney, Agent, or Firm* — Vierra Magen Marcus LLP

(57) ABSTRACT

A method is disclosed for displaying a practice swing ball flight to a user in a virtual golf game. The practice swing ball flight illustrates to the user a ball flight resulting from a practice swing, had the practice swing instead been an actual swing intended to strike a virtual golf ball.

20 Claims, 19 Drawing Sheets

(56) References Cited

U.S. PATENT DOCUMENTS

| | | | |
|---|---|---|---|
| 5,148,154 | A | 9/1992 | MacKay et al. |
| 5,184,295 | A | 2/1993 | Mann |
| 5,229,754 | A | 7/1993 | Aoki et al. |
| 5,229,756 | A | 7/1993 | Kosugi et al. |
| 5,239,463 | A | 8/1993 | Blair et al. |
| 5,239,464 | A | 8/1993 | Blair et al. |
| 5,288,078 | A | 2/1994 | Capper et al. |
| 5,295,491 | A | 3/1994 | Gevins |
| 5,320,538 | A | 6/1994 | Baum |
| 5,342,051 | A | 8/1994 | Rankin et al. |
| 5,347,306 | A | 9/1994 | Nitta |
| 5,385,519 | A | 1/1995 | Hsu et al. |
| 5,405,152 | A | 4/1995 | Katanics et al. |
| 5,417,210 | A | 5/1995 | Funda et al. |
| 5,423,554 | A | 6/1995 | Davis |
| 5,454,043 | A | 9/1995 | Freeman |
| 5,469,740 | A | 11/1995 | French et al. |
| 5,495,576 | A | 2/1996 | Ritchey |
| 5,516,105 | A | 5/1996 | Eisenbrey et al. |
| 5,524,637 | A | 6/1996 | Erickson et al. |
| 5,534,917 | A | 7/1996 | MacDougall |
| 5,563,988 | A | 10/1996 | Maes et al. |
| 5,577,981 | A | 11/1996 | Jarvik |
| 5,580,249 | A | 12/1996 | Jacobsen et al. |
| 5,594,469 | A | 1/1997 | Freeman et al. |
| 5,597,309 | A | 1/1997 | Riess |
| 5,616,078 | A | 4/1997 | Oh |
| 5,617,312 | A | 4/1997 | Iura et al. |
| 5,638,300 | A * | 6/1997 | Johnson ............ 702/153 |
| 5,641,288 | A | 6/1997 | Zaenglein |
| 5,682,196 | A | 10/1997 | Freeman |
| 5,682,229 | A | 10/1997 | Wangler |
| 5,690,582 | A | 11/1997 | Ulrich et al. |
| 5,692,965 | A | 12/1997 | Nighan, Jr. et al. |
| 5,703,367 | A | 12/1997 | Hashimoto et al. |
| 5,704,837 | A | 1/1998 | Iwasaki et al. |
| 5,715,834 | A | 2/1998 | Bergamasco et al. |
| 5,875,108 | A | 2/1999 | Hoffberg et al. |
| 5,877,803 | A | 3/1999 | Wee et al. |
| 5,913,727 | A | 6/1999 | Ahdoot |
| 5,933,125 | A | 8/1999 | Fernie |
| 5,980,256 | A | 11/1999 | Carmein |
| 5,989,157 | A | 11/1999 | Walton |
| 5,995,649 | A | 11/1999 | Marugame |
| 6,005,548 | A | 12/1999 | Latypov et al. |
| 6,009,210 | A | 12/1999 | Kang |
| 6,054,991 | A | 4/2000 | Crane et al. |
| 6,066,075 | A | 5/2000 | Poulton |
| 6,072,494 | A | 6/2000 | Nguyen |
| 6,073,489 | A | 6/2000 | French et al. |
| 6,077,201 | A | 6/2000 | Cheng et al. |
| 6,098,458 | A | 8/2000 | French et al. |
| 6,100,896 | A | 8/2000 | Strohecker et al. |
| 6,101,289 | A | 8/2000 | Kellner |
| 6,128,003 | A | 10/2000 | Smith et al. |
| 6,130,677 | A | 10/2000 | Kunz |
| 6,141,463 | A | 10/2000 | Covell et al. |
| 6,147,678 | A | 11/2000 | Kumar et al. |
| 6,152,856 | A | 11/2000 | Studor et al. |
| 6,159,100 | A | 12/2000 | Smith |
| 6,173,066 | B1 | 1/2001 | Peurach et al. |
| 6,181,343 | B1 | 1/2001 | Lyons |
| 6,188,777 | B1 | 2/2001 | Darrell et al. |
| 6,215,890 | B1 | 4/2001 | Matsuo et al. |
| 6,215,898 | B1 | 4/2001 | Woodfill et al. |
| 6,226,396 | B1 | 5/2001 | Marugame |
| 6,229,913 | B1 | 5/2001 | Nayar et al. |
| 6,256,033 | B1 | 7/2001 | Nguyen |
| 6,256,400 | B1 | 7/2001 | Takata et al. |
| 6,283,860 | B1 | 9/2001 | Lyons et al. |
| 6,289,112 | B1 | 9/2001 | Jain et al. |
| 6,299,308 | B1 | 10/2001 | Voronka et al. |
| 6,308,565 | B1 | 10/2001 | French et al. |
| 6,316,934 | B1 | 11/2001 | Amorai-Moriya et al. |
| 6,363,160 | B1 | 3/2002 | Bradski et al. |
| 6,384,819 | B1 | 5/2002 | Hunter |
| 6,411,744 | B1 | 6/2002 | Edwards |
| 6,430,997 | B1 | 8/2002 | French et al. |
| 6,476,834 | B1 | 11/2002 | Doval et al. |
| 6,496,598 | B1 | 12/2002 | Harman |
| 6,503,195 | B1 | 1/2003 | Keller et al. |
| 6,539,931 | B2 | 4/2003 | Trajkovic et al. |
| 6,569,028 | B1 | 5/2003 | Nichols et al. |
| 6,570,555 | B1 | 5/2003 | Prevost et al. |
| 6,633,294 | B1 | 10/2003 | Rosenthal et al. |
| 6,640,202 | B1 | 10/2003 | Dietz et al. |
| 6,661,918 | B1 | 12/2003 | Gordon et al. |
| 6,681,031 | B2 | 1/2004 | Cohen et al. |
| 6,714,665 | B1 | 3/2004 | Hanna et al. |
| 6,731,799 | B1 | 5/2004 | Sun et al. |
| 6,738,066 | B1 | 5/2004 | Nguyen |
| 6,758,759 | B2 | 7/2004 | Gobush et al. |
| 6,765,726 | B2 | 7/2004 | French et al. |
| 6,788,809 | B1 | 9/2004 | Grzeszczuk et al. |
| 6,801,637 | B2 | 10/2004 | Voronka et al. |
| 6,873,723 | B1 | 3/2005 | Aucsmith et al. |
| 6,876,496 | B2 | 4/2005 | French et al. |
| 6,937,742 | B2 | 8/2005 | Roberts et al. |
| 6,950,534 | B2 | 9/2005 | Cohen et al. |
| 7,003,134 | B1 | 2/2006 | Covell et al. |
| 7,036,094 | B1 | 4/2006 | Cohen et al. |
| 7,038,855 | B2 | 5/2006 | French et al. |
| 7,039,676 | B1 | 5/2006 | Day et al. |
| 7,042,440 | B2 | 5/2006 | Pryor et al. |
| 7,050,606 | B2 | 5/2006 | Paul et al. |
| 7,058,204 | B2 | 6/2006 | Hildreth et al. |
| 7,060,957 | B2 | 6/2006 | Lange et al. |
| 7,113,918 | B1 | 9/2006 | Ahmad et al. |
| 7,121,946 | B2 | 10/2006 | Paul et al. |
| 7,170,492 | B2 | 1/2007 | Bell |
| 7,184,048 | B2 | 2/2007 | Hunter |
| 7,202,898 | B1 | 4/2007 | Braun et al. |
| 7,222,078 | B2 | 5/2007 | Abelow |
| 7,227,526 | B2 | 6/2007 | Hildreth et al. |
| 7,259,747 | B2 | 8/2007 | Bell |
| 7,308,112 | B2 | 12/2007 | Fujimura et al. |
| 7,317,836 | B2 | 1/2008 | Fujimura et al. |
| 7,348,963 | B2 | 3/2008 | Bell |
| 7,359,121 | B2 | 4/2008 | French et al. |
| 7,367,887 | B2 | 5/2008 | Watabe et al. |
| 7,379,563 | B2 | 5/2008 | Shamaie |
| 7,379,566 | B2 | 5/2008 | Hildreth |
| 7,389,591 | B2 | 6/2008 | Jaiswal et al. |
| 7,412,077 | B2 | 8/2008 | Li et al. |
| 7,421,093 | B2 | 9/2008 | Hildreth et al. |
| 7,430,312 | B2 | 9/2008 | Gu |
| 7,436,496 | B2 | 10/2008 | Kawahito |
| 7,450,736 | B2 | 11/2008 | Yang et al. |
| 7,452,275 | B2 | 11/2008 | Kuraishi |
| 7,460,690 | B2 | 12/2008 | Cohen et al. |
| 7,489,812 | B2 | 2/2009 | Fox et al. |
| 7,536,032 | B2 | 5/2009 | Bell |
| 7,555,142 | B2 | 6/2009 | Hildreth et al. |
| 7,560,701 | B2 | 7/2009 | Oggier et al. |
| 7,570,805 | B2 | 8/2009 | Gu |
| 7,574,020 | B2 | 8/2009 | Shamaie |
| 7,576,727 | B2 | 8/2009 | Bell |
| 7,590,262 | B2 | 9/2009 | Fujimura et al. |
| 7,593,552 | B2 | 9/2009 | Higaki et al. |
| 7,598,942 | B2 | 10/2009 | Underkoffler et al. |
| 7,607,509 | B2 | 10/2009 | Schmiz et al. |
| 7,620,202 | B2 | 11/2009 | Fujimura et al. |
| 7,668,340 | B2 | 2/2010 | Cohen et al. |
| 7,680,298 | B2 | 3/2010 | Roberts et al. |
| 7,683,954 | B2 | 3/2010 | Ichikawa et al. |
| 7,684,592 | B2 | 3/2010 | Paul et al. |
| 7,701,439 | B2 | 4/2010 | Hillis et al. |
| 7,702,130 | B2 | 4/2010 | Im et al. |
| 7,704,135 | B2 | 4/2010 | Harrison, Jr. |
| 7,710,391 | B2 | 5/2010 | Bell et al. |
| 7,729,530 | B2 | 6/2010 | Antonov et al. |
| 7,746,345 | B2 | 6/2010 | Hunter |
| 7,760,182 | B2 | 7/2010 | Ahmad et al. |
| 7,809,167 | B2 | 10/2010 | Bell |

(56) References Cited

U.S. PATENT DOCUMENTS

| | | | |
|---|---|---|---|
| 7,834,846 | B1 | 11/2010 | Bell |
| 7,852,262 | B2 | 12/2010 | Namineni et al. |
| RE42,256 | E | 3/2011 | Edwards |
| 7,898,522 | B2 | 3/2011 | Hildreth et al. |
| 8,035,612 | B2 | 10/2011 | Bell et al. |
| 8,035,614 | B2 | 10/2011 | Bell et al. |
| 8,035,624 | B2 | 10/2011 | Bell et al. |
| 8,072,470 | B2 | 12/2011 | Marks |
| 2008/0020856 | A1 | 1/2008 | Rosa |
| 2008/0026838 | A1 | 1/2008 | Dunstan et al. |
| 2008/0182685 | A1* | 7/2008 | Marty et al. .............. 473/407 |
| 2009/0042661 | A1* | 2/2009 | Cheng .................. 473/266 |
| 2009/0131191 | A1* | 5/2009 | Priester et al. ............ 473/228 |
| 2010/0081116 | A1* | 4/2010 | Barasch et al. ............ 434/252 |
| 2011/0299729 | A1* | 12/2011 | Dawe et al. .............. 382/103 |
| 2012/0238380 | A9* | 9/2012 | Marty et al. .............. 473/407 |

FOREIGN PATENT DOCUMENTS

| | | |
|---|---|---|
| JP | 08044490 A1 | 2/1996 |
| WO | 93/10708 A1 | 6/1993 |
| WO | 97/17598 A1 | 5/1997 |
| WO | 99/44698 A1 | 9/1999 |

OTHER PUBLICATIONS

Miyagawa et al., "CCD-Based Range Finding Sensor", Oct. 1997, pp. 1648-1652, vol. 44 No. 10, IEEE Transactions on Electron Devices.

Rosenhahn et al., "Automatic Human Model Generation", 2005, pp. 41-48, University of Auckland (CITR), New Zealand.

Aggarwal et al., "Human Motion Analysis: A Review", IEEE Nonrigid and Articulated Motion Workshop, 1997, University of Texas at Austin, Austin, TX.

Shao et al., "An Open System Architecture for a Multimedia and Multimodal User Interface", Aug. 24, 1998, Japanese Society for Rehabilitation of Persons with Disabilities (JSRPD), Japan.

Kohler, "Special Topics of Gesture Recognition Applied in Intelligent Home Environments", In Proceedings of the Gesture Workshop, 1998, pp. 285-296, Germany.

Kohler, "Vision Based Remote Control in Intelligent Home Environments", University of Erlangen-Nuremberg/ Germany, 1996, pp. 147-154, Germany.

Kohler, "Technical Details and Ergonomical Aspects of Gesture Recognition applied in Intelligent Home Environments", 1997, Germany.

Hasegawa et al., "Human-Scale Haptic Interaction with a Reactive Virtual Human in a Real-Time Physics Simulator", Jul. 2006, vol. 4, No. 3, Article 6C, ACM Computers in Entertainment, New York, NY.

Qian et al., "A Gesture-Driven Multimodal Interactive Dance System", Jun. 2004, pp. 1579-1582, IEEE International Conference on Multimedia and Expo (ICME), Taipei, Taiwan.

Zhao, "Dressed Human Modeling, Detection, and Parts Localization", 2001, The Robotics Institute, Carnegie Mellon University, Pittsburgh, PA.

He, "Generation of Human Body Models", Apr. 2005, University of Auckland, New Zealand.

Isard et al., "Condensation—Conditional Density Propagation for Visual Tracking", 1998, pp. 5-28, International Journal of Computer Vision 29(1), Netherlands.

Livingston, "Vision-based Tracking with Dynamic Structured Light for Video See-through Augmented Reality", 1998, University of North Carolina at Chapel Hill, North Carolina, USA.

Wren et al., "Pfinder: Real-Time Tracking of the Human Body", MIT Media Laboratory Perceptual Computing Section Technical Report No. 353, Jul. 1997, vol. 19, No. 7, pp. 780-785, IEEE Transactions on Pattern Analysis and Machine Intelligence, Caimbridge, MA.

Breen et al., "Interactive Occlusion and Collision of Real and Virtual Objects in Augmented Reality", Technical Report ECRC-95-02, 1995, European Computer-Industry Research Center GmbH, Munich, Germany.

Freeman et al., "Television Control by Hand Gestures", Dec. 1994, Mitsubishi Electric Research Laboratories, TR94-24, Caimbridge, MA.

Hongo et al., "Focus of Attention for Face and Hand Gesture Recognition Using Multiple Cameras", Mar. 2000, pp. 156-161, 4th IEEE International Conference on Automatic Face and Gesture Recognition, Grenoble, France.

Pavlovic et al., "Visual Interpretation of Hand Gestures for Human-Computer Interaction: A Review", Jul. 1997, pp. 677-695, vol. 19, No. 7, IEEE Transactions on Pattern Analysis and Machine Intelligence.

Azarbayejani et al., "Visually Controlled Graphics", Jun. 1993, vol. 15, No. 6, IEEE Transactions on Pattern Analysis and Machine Intelligence.

Granieri et al., "Simulating Humans in VR", The British Computer Society, Oct. 1994, Academic Press.

Brogan et al., "Dynamically Simulated Characters in Virtual Environments", Sep./Oct. 1998, pp. 2-13, vol. 18, Issue 5, IEEE Computer Graphics and Applications.

Fisher et al., "Virtual Environment Display System", ACM Workshop on Interactive 3D Graphics, Oct. 1986, Chapel Hill, NC.

"Virtual High Anxiety", Tech Update, Aug. 1995, pp. 22.

Sheridan et al., "Virtual Reality Check", Technology Review, Oct. 1993, pp. 22-28, vol. 96, No. 7.

Stevens, "Flights into Virtual Reality Treating Real World Disorders", The Washington Post, Mar. 27, 1995, Science Psychology, 2 pages.

"Simulation and Training", 1994, Division Incorporated.

English Machine-translation of Japanese Publication No. JP08-044490 published on Feb. 16, 1996.

"Optishot Golf: The Affordable Golf Simulator." Golf Swing Trainer Reviews [online]. Retrieved from the Internet on Jul. 11, 2011, URL: <http://golfswingtrainerreviews.com/optishot>. 2 pages.

"The Slinger Overview." SligerGolf [online]. Retrieved from the Internet on Jul. 11, 2011, URL: <http://slingergolf.com/the-slinger/>. 3 pages.

* cited by examiner

DYNAMIC CAMERA BASED PRACTICE MODE

RELATED APPLICATION

The present application claims priority to U.S. Provisional Patent Application No. 61/493,684, entitled "Dynamic Camera Based Practice Mode," filed Jun. 6, 2011, which application is incorporated by reference herein in its entirety.

BACKGROUND

In the past, computing applications such as computer games and multimedia applications used controls to allow users to manipulate game characters or other aspects of an application. Typically such controls are input using, for example, controllers, remotes, keyboards, mice, or the like. More recently, computer games and multimedia applications have begun employing cameras and software gesture recognition engines to provide a natural user interface ("NUI"). With a NUI interface, user gestures are detected, interpreted and used to control game characters or other aspects of an application.

Golf gaming applications are known for NUI systems. However, such games do not provide feedback on the accuracy of a user's practice swings.

SUMMARY

The present technology in general relates to providing visual feedback to a user with regard to the accuracy of his or her practice swing with respect to an intended target in a NUI golf gaming application.

In one example, the present technology relates to a method for presenting a practice swing ball flight on a display in a video gaming application, comprising: (a) determining a ball flight of a virtual ball struck with a practice swing performed by a user; (b) determining a position of a virtual camera for displaying the ball flight; and (c) displaying the practice swing ball flight on the display from a perspective of the virtual camera.

In another example, the present technology relates to a method for presenting a practice swing ball flight on a display in a golf video gaming application, comprising: (a) receiving a predefined gesture from a user indicative of a practice golf swing via a natural user interface; (b) determining a ball flight of a virtual ball struck with the practice swing performed by a user; (c) varying the perspective of a virtual camera to follow the practice swing ball flight of the virtual ball struck with the practice swing; (d) determining a position of a virtual camera for displaying the ball flight; and (e) displaying the practice swing ball flight on the display from a perspective of the virtual camera.

In a further example, the present technology relates to a method for presenting a practice swing ball flight on a display in a golf video gaming application, comprising: (a) receiving a first predefined gesture from a user indicative of a practice golf swing via a natural user interface; (b) determining a first ball flight of a virtual ball struck with the practice swing performed by a user; (c) determining a position of a virtual camera for displaying the first ball flight; (d) displaying the practice swing ball flight on the display from a perspective of the virtual camera; (e) receiving a second predefined gesture from a user indicative of an actual golf swing intended to strike the virtual golf ball via the natural user interface; (f) determining a second ball flight of the virtual ball struck with the actual swing performed by the user; (g) determining a position of a virtual camera for displaying the second ball flight; (h) displaying the ball flight on the display resulting from the actual golf swing from a perspective of the virtual camera.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure.

DETAILED DESCRIPTION

Embodiments of the present technology will now be described with reference to FIGS. 1A-16, which in general relate to a system for indicating the accuracy of a practice swing in a golf gaming application. In particular, the present technology displays the flight path a golf ball would have taken if a practice swing was instead a "real" swing (a swing intended to strike the virtual golf ball in the gaming application). Embodiments are described below with respect to a NUI system, but it is contemplated that the system of the present disclosure may be used in golf gaming applications adapted for systems other than NUI systems. Moreover, while described below with respect to a golf gaming application, the system of the present disclosure can be used in other gaming applications, such as for example baseball, basketball, bowling, etc. to show the flight path a ball would have taken if a practice swing, shot, toss, etc. were instead real.

Figure 1A:
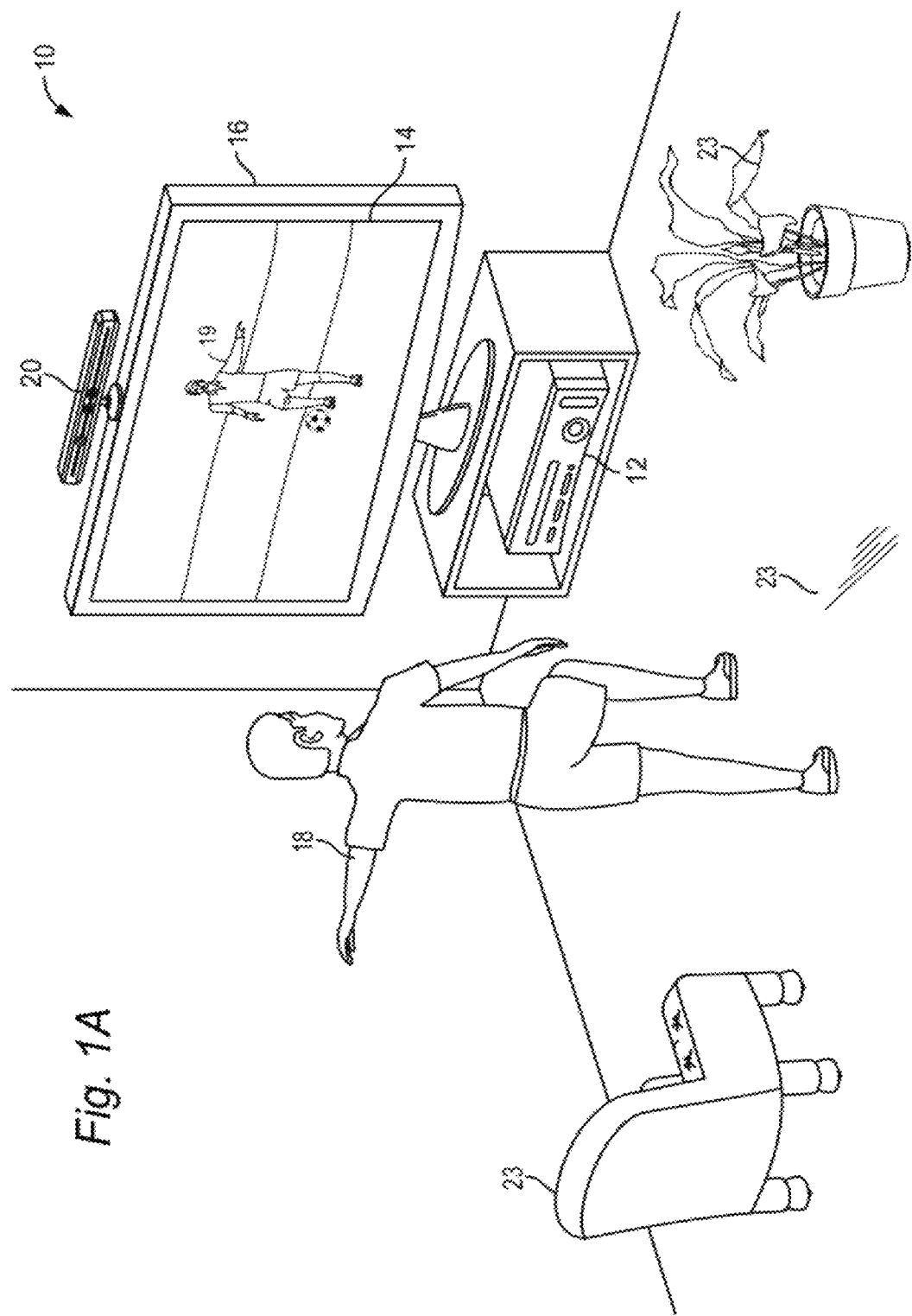
FIGS. 1A-1D illustrate example embodiments of a target recognition, analysis, and tracking system with a user playing a game.
Figure 1B:
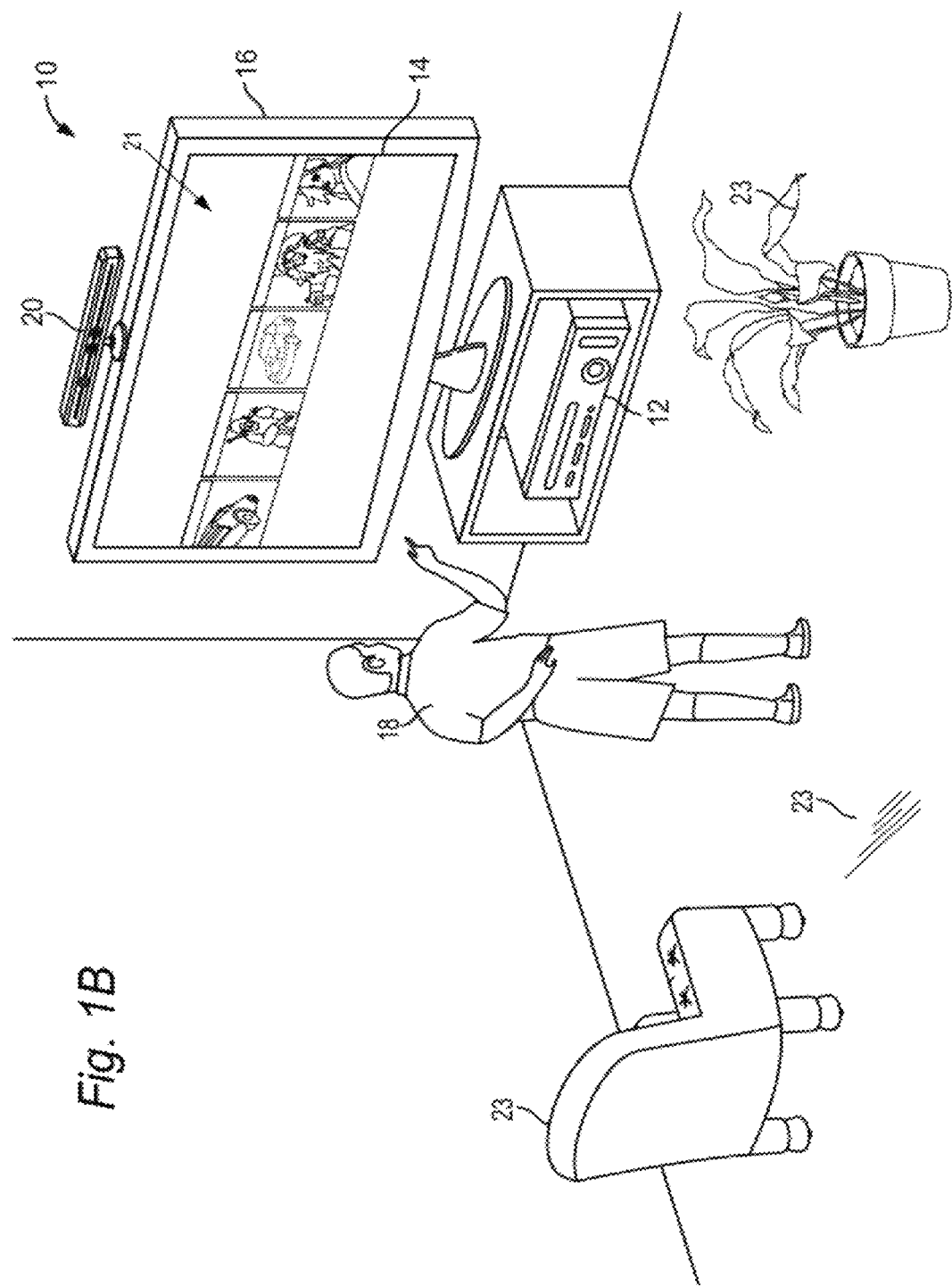
Figure 1C:
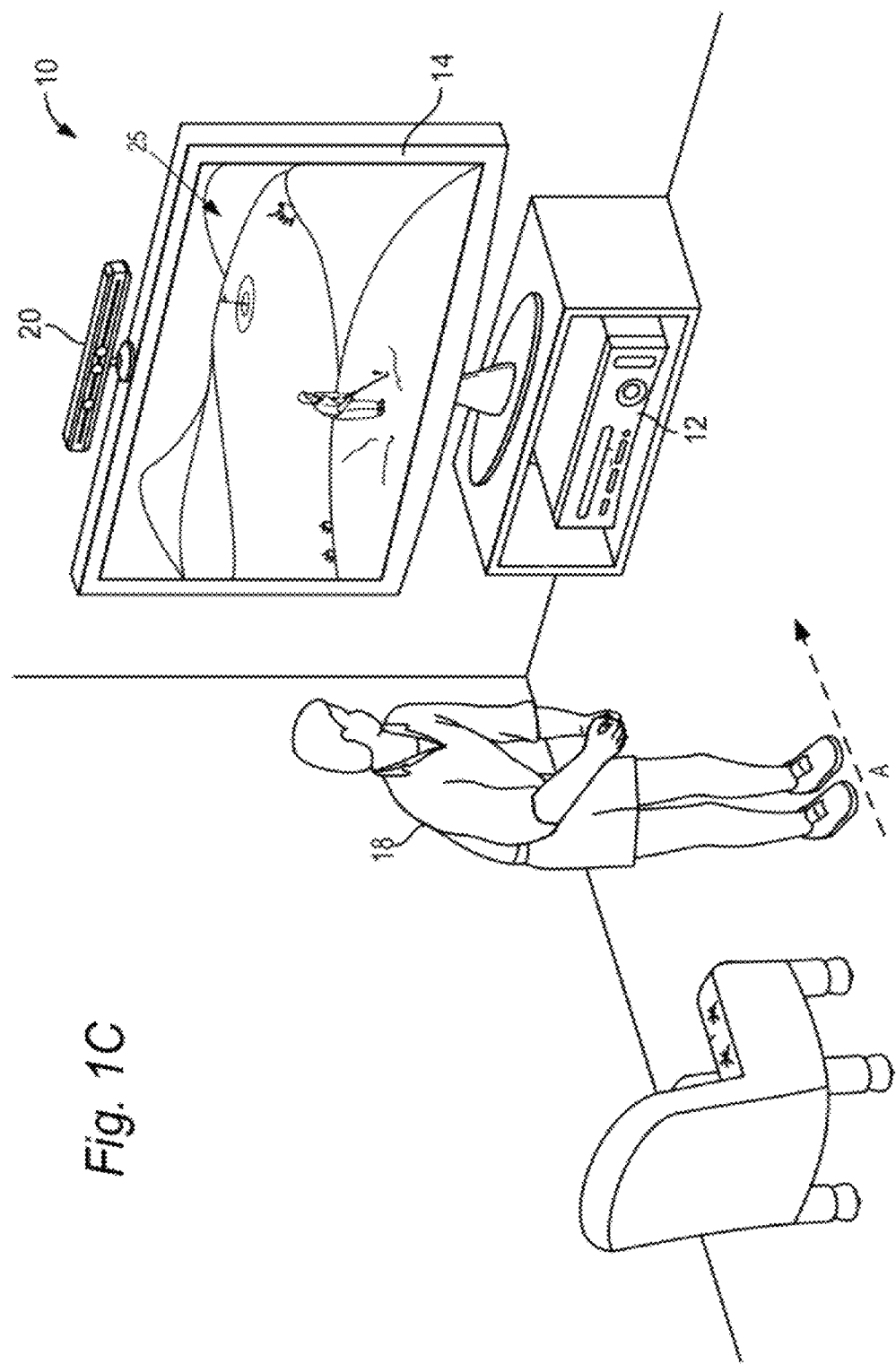
Figure 1D:
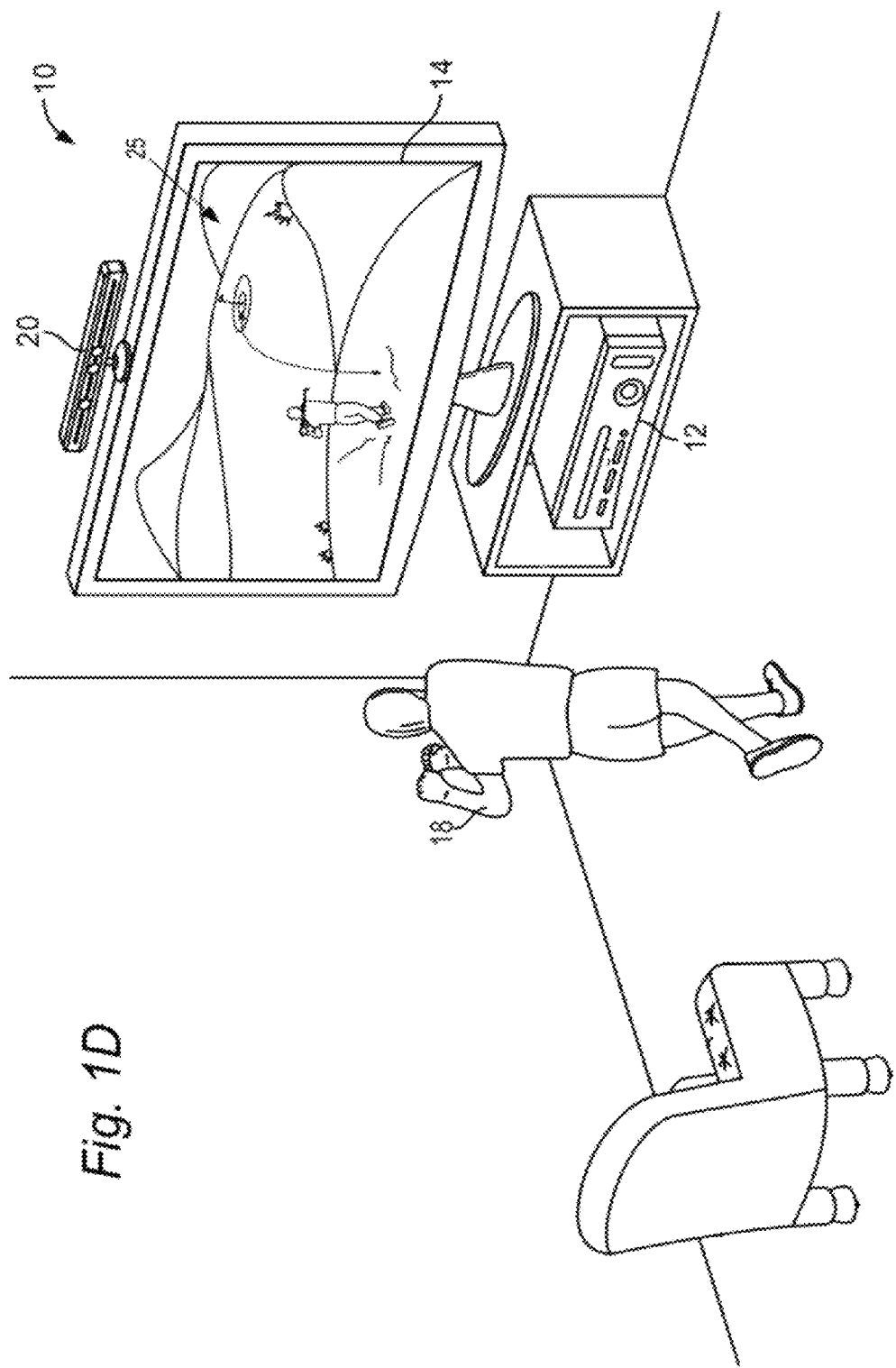
Figure 2:
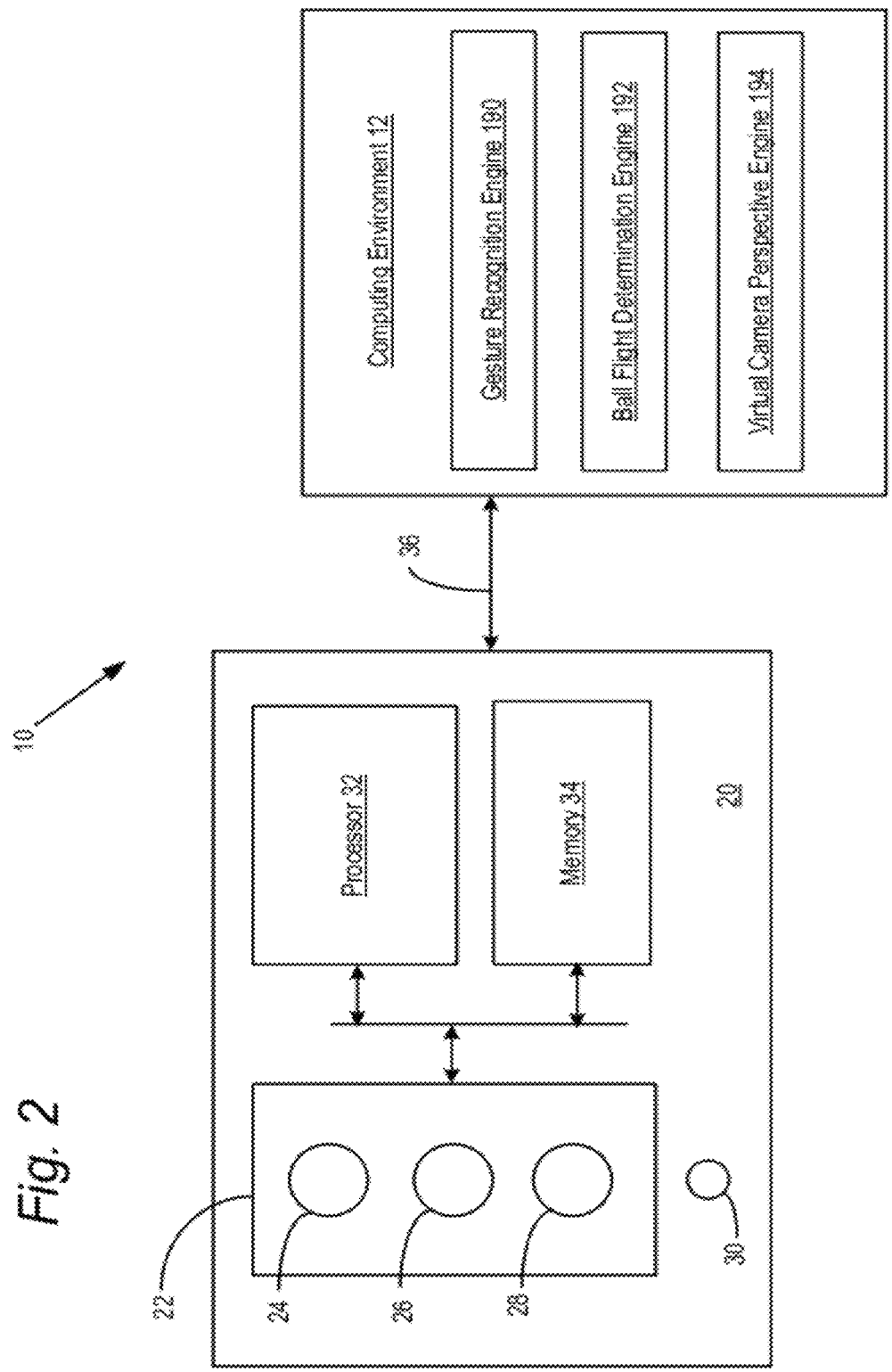
FIG. 2 illustrates an example embodiment of a capture device that may be used in a target recognition, analysis, and tracking system.

Referring initially to FIGS. 1A-2, the hardware for implementing the present technology includes a target recognition, analysis, and tracking system 10 which may be used to recognize, analyze, and/or track a human target such as the user 18. Embodiments of the target recognition, analysis, and tracking system 10 include a computing environment 12 for executing a gaming or other application. The computing environment 12 may include hardware components and/or software components such that computing environment 12 may be used to execute applications such as gaming and non-gaming applications. In one embodiment, computing environment 12 may include a processor such as a standardized processor, a specialized processor, a microprocessor, or the like that may execute instructions stored on a processor readable storage device for performing processes described herein.

The system 10 further includes a capture device 20 for capturing image and audio data relating to one or more users and/or objects sensed by the capture device. In embodiments, the capture device 20 may be used to capture information relating to body and hand movements and/or gestures and speech of one or more users, which information is received by the computing environment and used to render, interact with and/or control aspects of a gaming or other application. Examples of the computing environment 12 and capture device 20 are explained in greater detail below.

Embodiments of the target recognition, analysis and tracking system 10 may be connected to an audio/visual (A/V) device 16 having a display 14. The device 16 may for example be a television, a monitor, a high-definition television (HDTV), or the like that may provide game or application visuals and/or audio to a user. For example, the computing environment 12 may include a video adapter such as a graphics card and/or an audio adapter such as a sound card that may provide audio/visual signals associated with the game or other application. The A/V device 16 may receive the audio/visual signals from the computing environment 12 and may then output the game or application visuals and/or audio associated with the audio/visual signals to the user 18. According to one embodiment, the audio/visual device 16 may be connected to the computing environment 12 via, for example, an S-Video cable, a coaxial cable, an HDMI cable, a DVI cable, a VGA cable, a component video cable, or the like.

In embodiments, the computing environment 12, the A/V device 16 and the capture device 20 may cooperate to render an avatar or on-screen character 19 on display 14. For example, FIG. 1A shows a user 18 playing a soccer gaming application. The user's movements are tracked and used to animate the movements of the avatar 19. In embodiments, the avatar 19 mimics the movements of the user 18 in real world space so that the user 18 may perform movements and gestures which control the movements and actions of the avatar 19 on the display 14. In FIG. 1B, the capture device 20 is used in a NUI system where, for example, a user 18 is scrolling through and controlling a user interface 21 with a variety of menu options presented on the display 14. In FIG. 1B, the computing environment 12 and the capture device 20 may be used to recognize and analyze movements and gestures of a user's body, and such movements and gestures may be interpreted as controls for the user interface.

FIGS. 1C and 1D illustrate a user 18 playing a golfing game running on computing environment 12. The onscreen avatar 19 tracks and mirrors a user's movements. Moreover, certain actions, such as the user 18 performing a swing as if holding a golf club, are interpreted as a golf swing gesture so that the avatar 19 strikes a golf ball which is then shown flying down a fairway 25 in FIG. 1D. Through other gestures, a user may indicate whether the swing performed is a practice swing or a real swing. As described below, the flight of the ball may be determined by a number of factors, including for example the club selected, the orientation of the user relative to capture device 20, and the speed with which a user swings. The gaming application may provide additional factors, such as for example wind speed and magnitude and drag.

Suitable examples of a system 10 and components thereof are found in the following co-pending patent applications, all of which are hereby specifically incorporated by reference: U.S. patent application Ser. No. 12/475,094, entitled "Environment and/or Target Segmentation," filed May 29, 2009; U.S. patent application Ser. No. 12/511,850, entitled "Auto Generating a Visual Representation," filed Jul. 29, 2009; U.S. patent application Ser. No. 12/474,655, entitled "Gesture Tool," filed May 29, 2009; U.S. patent application Ser. No. 12/603,437, entitled "Pose Tracking Pipeline," filed Oct. 21, 2009; U.S. patent application Ser. No. 12/475,308, entitled "Device for Identifying and Tracking Multiple Humans Over Time," filed May 29, 2009, U.S. patent application Ser. No. 12/575,388, entitled "Human Tracking System," filed Oct. 7, 2009; U.S. patent application Ser. No. 12/422,661, entitled "Gesture Recognizer System Architecture," filed Apr. 13, 2009; U.S. patent application Ser. No. 12/391,150, entitled "Standard Gestures," filed Feb. 23, 2009; and U.S. patent application Ser. No. 12/474,655, entitled "Gesture Tool," filed May 29, 2009.

FIG. 2 illustrates an example embodiment of the capture device 20 that may be used in the target recognition, analysis, and tracking system 10. In an example embodiment, the capture device 20 may be configured to capture video having a depth image that may include depth values via any suitable technique including, for example, time-of-flight, structured light, stereo image, or the like. According to one embodiment, the capture device 20 may organize the calculated depth information into "Z layers," or layers that may be perpendicular to a Z axis extending from the depth camera along its line of sight. X and Y axes may be defined as being perpendicular to the Z axis. The Y axis may be vertical and the X axis may be horizontal. Together, the X, Y and Z axes define the 3-D real world space captured by capture device 20.

As shown in FIG. 2, the capture device 20 may include an image camera component 22. According to an example embodiment, the image camera component 22 may be a depth camera that may capture the depth image of a scene. The depth image may include a two-dimensional (2-D) pixel area of the captured scene where each pixel in the 2-D pixel area may represent a depth value such as a length or distance in, for example, centimeters, millimeters, or the like of an object in the captured scene from the camera.

As shown in FIG. 2, according to an example embodiment, the image camera component 22 may include an IR light component 24, a three-dimensional (3-D) camera 26, and an RGB camera 28 that may be used to capture the depth image of a scene. For example, in time-of-flight analysis, the IR light component 24 of the capture device 20 may emit an infrared light onto the scene and may then use sensors (not shown) to detect the backscattered light from the surface of one or more targets and objects in the scene using, for example, the 3-D camera 26 and/or the RGB camera 28.

In some embodiments, pulsed infrared light may be used such that the time between an outgoing light pulse and a corresponding incoming light pulse may be measured and used to determine a physical distance from the capture device 20 to a particular location on the targets or objects in the scene. Additionally, in other example embodiments, the phase of the outgoing light wave may be compared to the phase of the incoming light wave to determine a phase shift. The phase shift may then be used to determine a physical distance from the capture device 20 to a particular location on the targets or objects.

According to another example embodiment, time-of-flight analysis may be used to indirectly determine a physical distance from the capture device 20 to a particular location on the targets or objects by analyzing the intensity of the reflected beam of light over time via various techniques including, for example, shuttered light pulse imaging.

In another example embodiment, the capture device 20 may use a structured light to capture depth information. In such an analysis, patterned light (i.e., light displayed as a known pattern such as a grid pattern or a stripe pattern) may be projected onto the scene via, for example, the IR light component 24. Upon striking the surface of one or more targets or objects in the scene, the pattern may become deformed in response. Such a deformation of the pattern may be captured by, for example, the 3-D camera 26 and/or the RGB camera 28 and may then be analyzed to determine a physical distance from the capture device 20 to a particular location on the targets or objects.

According to another embodiment, the capture device 20 may include two or more physically separated cameras that may view a scene from different angles, to obtain visual stereo data that may be resolved to generate depth information. In another example embodiment, the capture device 20 may use point cloud data and target digitization techniques to detect features of the user.

The capture device 20 may further include a microphone 30. The microphone 30 may include a transducer or sensor that may receive and convert sound into an electrical signal. According to one embodiment, the microphone 30 may be used to reduce feedback between the capture device 20 and the computing environment 12 in the target recognition, analysis, and tracking system 10. Additionally, the microphone 30 may be used to receive audio signals that may also be provided by the user to control applications such as game applications, non-game applications, or the like that may be executed by the computing environment 12.

In an example embodiment, the capture device 20 may further include a processor 32 that may be in operative communication with the image camera component 22. The processor 32 may include a standardized processor, a specialized processor, a microprocessor, or the like that may execute instructions that may include instructions for receiving the depth image, determining whether a suitable target may be included in the depth image, converting the suitable target into a skeletal representation or model of the target, or any other suitable instruction.

The capture device 20 may further include a memory component 34 that may store the instructions that may be executed by the processor 32, images or frames of images captured by the 3-D camera or RGB camera, or any other suitable information, images, or the like. According to an example embodiment, the memory component 34 may include random access memory (RAM), read only memory (ROM), cache, Flash memory, a hard disk, or any other suitable storage component. As shown in FIG. 2, in one embodiment, the memory component 34 may be a separate component in communication with the image camera component 22 and the processor 32. According to another embodiment, the memory component 34 may be integrated into the processor 32 and/or the image camera component 22.

As shown in FIG. 2, the capture device 20 may be in communication with the computing environment 12 via a communication link 36. The communication link 36 may be a wired connection including, for example, a USB connection, a Firewire connection, an Ethernet cable connection, or the like and/or a wireless connection such as a wireless 802.11b, g, a, or n connection. According to one embodiment, the computing environment 12 may provide a clock to the capture device 20 that may be used to determine when to capture, for example, a scene via the communication link 36.

Additionally, the capture device 20 may provide the depth information and images captured by, for example, the 3-D camera 26 and/or the RGB camera 28. With the aid of these devices, a partial skeletal model may be developed in accordance with the present technology, with the resulting data provided to the computing environment 12 via the communication link 36.

The computing environment 12 may further include a gesture recognition engine 190 for recognizing gestures as explained below. In accordance with the present system, the computing environment 12 may further include a ball flight determination engine 192, and a virtual camera perspective engine 194. Each of these software engines is described in greater detail below.

Figure 3A:
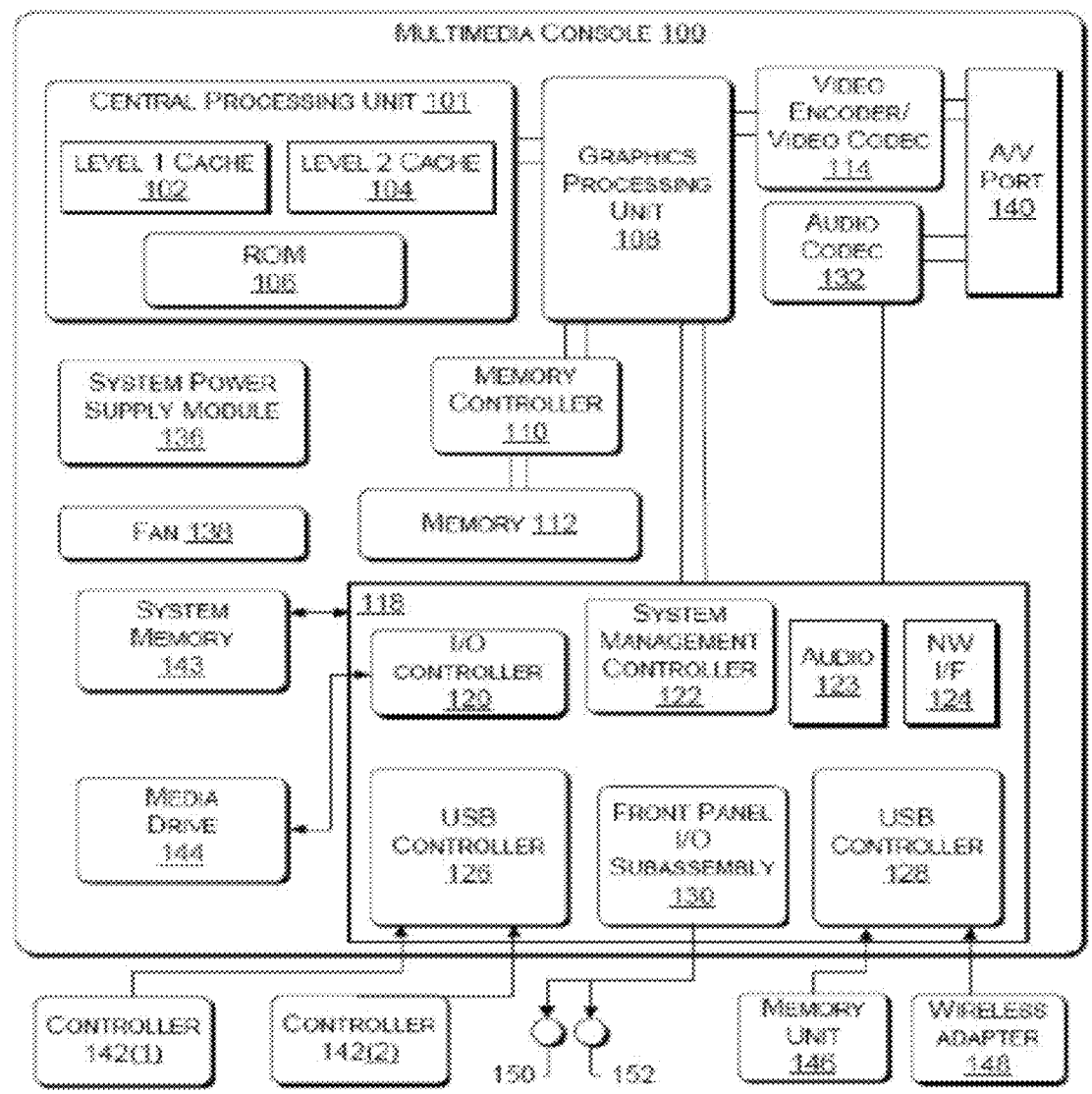
FIG. 3A illustrates an example embodiment of a computing environment that may be used to interpret one or more gestures in a target recognition, analysis, and tracking system.

FIG. 3A illustrates an example embodiment of a computing environment that may be used to interpret one or more gestures in a target recognition, analysis, and tracking system. The computing environment such as the computing environment 12 described above with respect to FIGS. 1A-2 may be a multimedia console 100, such as a gaming console. As shown in FIG. 3A, the multimedia console 100 has a central processing unit (CPU) 101 having a level 1 cache 102, a level 2 cache 104, and a flash ROM 106. The level 1 cache 102 and a level 2 cache 104 temporarily store data and hence reduce the number of memory access cycles, thereby improving processing speed and throughput. The CPU 101 may be provided having more than one core, and thus, additional level 1 and level 2 caches 102 and 104. The flash ROM 106 may store executable code that is loaded during an initial phase of a boot process when the multimedia console 100 is powered ON.

A graphics processing unit (GPU) 108 and a video encoder/video codec (coder/decoder) 114 form a video processing pipeline for high speed and high resolution graphics processing. Data is carried from the GPU 108 to the video encoder/video codec 114 via a bus. The video processing pipeline outputs data to an A/V (audio/video) port 140 for transmission to a television or other display. A memory controller 110 is connected to the GPU 108 to facilitate processor access to various types of memory 112, such as, but not limited to, a RAM.

The multimedia console 100 includes an I/O controller 120, a system management controller 122, an audio processing unit 123, a network interface controller 124, a first USB host controller 126, a second USB host controller 128 and a front panel I/O subassembly 130 that are preferably implemented on a module 118. The USB controllers 126 and 128 serve as hosts for peripheral controllers 142(1)-142(2), a wireless adapter 148, and an external memory device 146 (e.g., flash memory, external CD/DVD ROM drive, removable media, etc.). The network interface 124 and/or wireless adapter 148 provide access to a network (e.g., the Internet, home network, etc.) and may be any of a wide variety of various wired or wireless adapter components including an Ethernet card, a modem, a Bluetooth module, a cable modem, and the like.

System memory 143 is provided to store application data that is loaded during the boot process. A media drive 144 is provided and may comprise a DVD/CD drive, hard drive, or other removable media drive, etc. The media drive 144 may be internal or external to the multimedia console 100. Application data may be accessed via the media drive 144 for execution, playback, etc. by the multimedia console 100. The media drive 144 is connected to the I/O controller 120 via a bus, such as a Serial ATA bus or other high speed connection (e.g., IEEE 1394).

The system management controller 122 provides a variety of service functions related to assuring availability of the multimedia console 100. The audio processing unit 123 and an audio codec 132 form a corresponding audio processing pipeline with high fidelity and stereo processing. Audio data is carried between the audio processing unit 123 and the audio codec 132 via a communication link. The audio processing pipeline outputs data to the A/V port 140 for reproduction by an external audio player or device having audio capabilities.

The front panel I/O subassembly 130 supports the functionality of the power button 150 and the eject button 152, as well as any LEDs (light emitting diodes) or other indicators exposed on the outer surface of the multimedia console 100. A system power supply module 136 provides power to the components of the multimedia console 100. A fan 138 cools the circuitry within the multimedia console 100.

The CPU 101, GPU 108, memory controller 110, and various other components within the multimedia console 100 are interconnected via one or more buses, including serial and parallel buses, a memory bus, a peripheral bus, and a processor or local bus using any of a variety of bus architectures. By way of example, such architectures can include a Peripheral Component Interconnects (PCI) bus, PCI-Express bus, etc.

When the multimedia console 100 is powered ON, application data may be loaded from the system memory 143 into memory 112 and/or caches 102, 104 and executed on the CPU 101. The application may present a graphical user interface that provides a consistent user experience when navigating to different media types available on the multimedia console 100. In operation, applications and/or other media contained within the media drive 144 may be launched or played from the media drive 144 to provide additional functionalities to the multimedia console 100.

The multimedia console 100 may be operated as a standalone system by simply connecting the system to a television or other display. In this standalone mode, the multimedia console 100 allows one or more users to interact with the system, watch movies, or listen to music. However, with the integration of broadband connectivity made available through the network interface 124 or the wireless adapter 148, the multimedia console 100 may further be operated as a participant in a larger network community.

When the multimedia console 100 is powered ON, a set amount of hardware resources are reserved for system use by the multimedia console operating system. These resources may include a reservation of memory (e.g., 16 MB), CPU and GPU cycles (e.g., 5%), networking bandwidth (e.g., 8 kbs), etc. Because these resources are reserved at system boot time, the reserved resources do not exist from the application's view.

In particular, the memory reservation preferably is large enough to contain the launch kernel, concurrent system applications and drivers. The CPU reservation is preferably constant such that if the reserved CPU usage is not used by the system applications, an idle thread will consume any unused cycles.

With regard to the GPU reservation, lightweight messages generated by the system applications (e.g., popups) are displayed by using a GPU interrupt to schedule code to render popup into an overlay. The amount of memory required for an overlay depends on the overlay area size and the overlay preferably scales with screen resolution. Where a full user interface is used by the concurrent system application, it is preferable to use a resolution independent of the application resolution. A scaler may be used to set this resolution such that the need to change frequency and cause a TV resynch is eliminated.

After the multimedia console 100 boots and system resources are reserved, concurrent system applications execute to provide system functionalities. The system functionalities are encapsulated in a set of system applications that execute within the reserved system resources described above. The operating system kernel identifies threads that are system application threads versus gaming application threads. The system applications are preferably scheduled to run on the CPU 101 at predetermined times and intervals in order to provide a consistent system resource view to the application. The scheduling is to minimize cache disruption for the gaming application running on the console.

When a concurrent system application requires audio, audio processing is scheduled asynchronously to the gaming application due to time sensitivity. A multimedia console application manager (described below) controls the gaming application audio level (e.g., mute, attenuate) when system applications are active.

Input devices (e.g., controllers 142(1) and 142(2)) are shared by gaming applications and system applications. The input devices are not reserved resources, but are to be switched between system applications and the gaming application such that each will have a focus of the device. The application manager preferably controls the switching of input stream, without knowledge of the gaming application's knowledge and a driver maintains state information regarding focus switches. The cameras 26, 28 and capture device 20 may define additional input devices for the console 100.

Figure 3B:
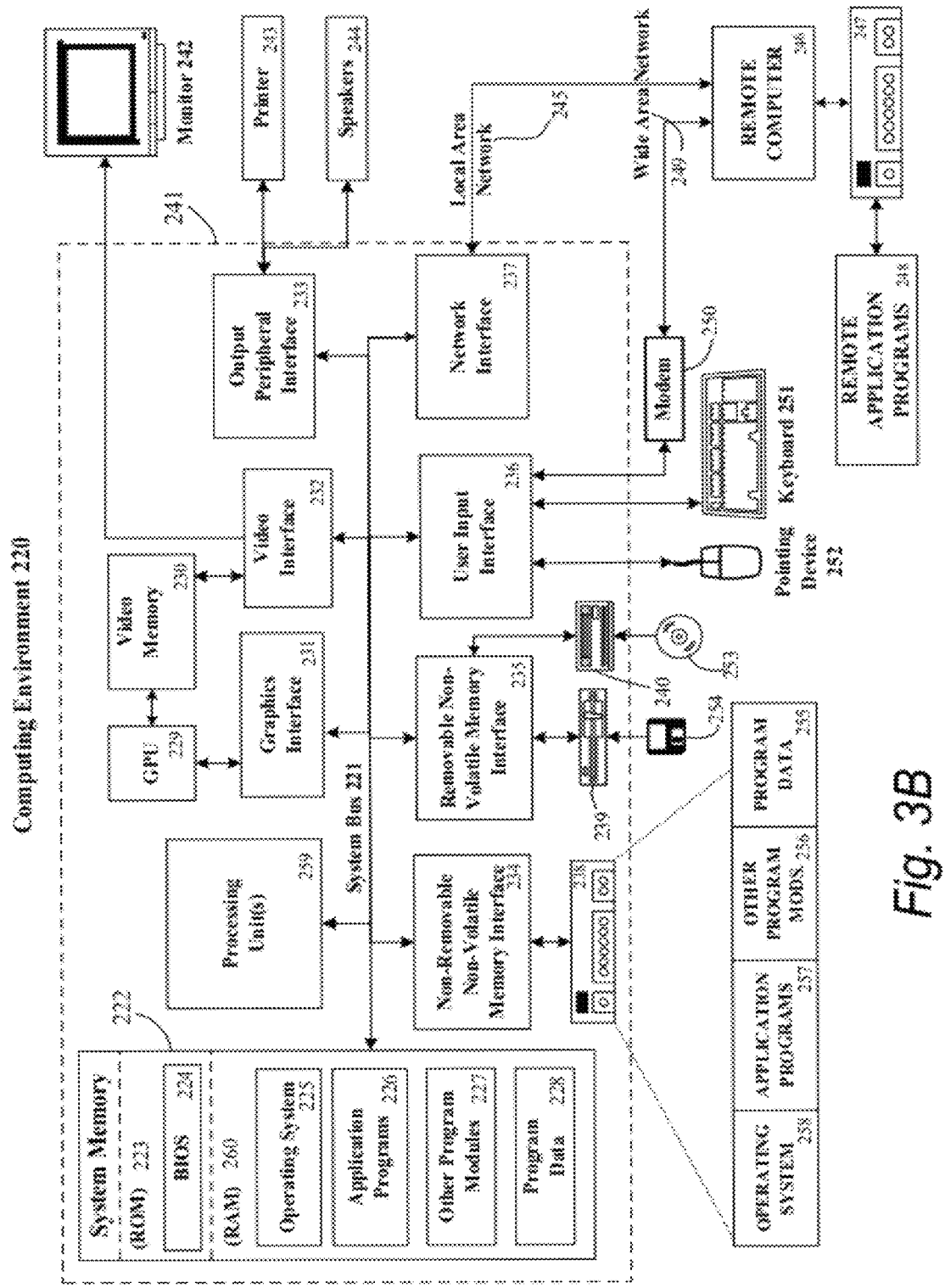
FIG. 3B illustrates another example embodiment of a computing environment that may be used to interpret one or more gestures in a target recognition, analysis, and tracking system.

FIG. 3B illustrates another example embodiment of a computing environment 220 that may be the computing environment 12 shown in FIGS. 1A-2 used to interpret one or more gestures in a target recognition, analysis, and tracking system. The computing system environment 220 is only one example of a suitable computing environment and is not intended to suggest any limitation as to the scope of use or functionality of the presently disclosed subject matter. Neither should the computing environment 220 be interpreted as having any dependency or requirement relating to any one or combination of components illustrated in the exemplary operating environment 220. In some embodiments, the various depicted computing elements may include circuitry configured to instantiate specific aspects of the present disclosure. For example, the term circuitry used in the disclosure can include specialized hardware components configured to perform function(s) by firmware or switches. In other example embodiments, the term circuitry can include a general purpose processing unit, memory, etc., configured by software instructions that embody logic operable to perform function(s). In example embodiments where circuitry includes a combination of hardware and software, an implementer may write source code embodying logic and the source code can be compiled into machine readable code that can be processed by the general purpose processing unit. Since one skilled in the art can appreciate that the state of the art has evolved to a point where there is little difference between hardware, software, or a combination of hardware/software, the selection of hardware versus software to effectuate specific functions is a design choice left to an implementer. More specifically, one of skill in the art can appreciate that a software process can be transformed into an equivalent hardware structure, and a hardware structure can itself be transformed into an equivalent software process. Thus, the selection of a hardware implementation versus a software implementation is one of design choice and left to the implementer.

In FIG. 3B, the computing environment 220 comprises a computer 241, which typically includes a variety of computer readable media. Computer readable media can be any available media that can be accessed by computer 241 and includes both volatile and nonvolatile media, removable and non-removable media. The system memory 222 includes computer storage media in the form of volatile and/or nonvolatile memory such as ROM 223 and RAM 260. A basic input/output system 224 (BIOS), containing the basic routines that help to transfer information between elements within computer 241, such as during start-up, is typically stored in ROM 223. RAM 260 typically contains data and/or program modules that are immediately accessible to and/or presently being operated on by processing unit 259. By way of example, and not limitation, FIG. 3B illustrates operating system 225, application programs 226, other program modules 227, and program data 228.

The computer 241 may also include other removable/non-removable, volatile/nonvolatile computer storage media. By way of example only, FIG. 3B illustrates a hard disk drive 238 that reads from or writes to non-removable, nonvolatile magnetic media, a magnetic disk drive 239 that reads from or writes to a removable, nonvolatile magnetic disk 254, and an optical disk drive 240 that reads from or writes to a removable, nonvolatile optical disk 253 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 238 is typically connected to the system bus 221 through a non-removable memory interface such as interface 234, and magnetic disk drive 239 and optical disk drive 240 are typically connected to the system bus 221 by a removable memory interface, such as interface 235.

The drives and their associated computer storage media discussed above and illustrated in FIG. 3B, provide storage of computer readable instructions, data structures, program modules and other data for the computer 241. In FIG. 3B, for example, hard disk drive 238 is illustrated as storing operating system 258, application programs 257, other program modules 256, and program data 255. Note that these components can either be the same as or different from operating system 225, application programs 226, other program modules 227, and program data 228. Operating system 258, application programs 257, other program modules 256, and program data 255 are given different numbers here to illustrate that, at a minimum, they are different copies. A user may enter commands and information into the computer 241 through input devices such as a keyboard 251 and a pointing device 252, commonly referred to as a mouse, trackball or touch pad. Other input devices (not shown) may include a microphone, joystick, game pad, satellite dish, scanner, or the like. These and other input devices are often connected to the processing unit 259 through a user input interface 236 that is coupled to the system bus, but may be connected by other interface and bus structures, such as a parallel port, game port or a universal serial bus (USB). The cameras 26, 28 and capture device 20 may define additional input devices for the console 100. A monitor 242 or other type of display device is also connected to the system bus 221 via an interface, such as a video interface 232. In addition to the monitor, computers may also include other peripheral output devices such as speakers 244 and printer 243, which may be connected through an output peripheral interface 233.

The computer 241 may operate in a networked environment using logical connections to one or more remote computers, such as a remote computer 246. The remote computer 246 may be a personal computer, a server, a router, a network PC, a peer device or other common network node, and typically includes many or all of the elements described above relative to the computer 241, although only a memory storage device 247 has been illustrated in FIG. 3B. The logical connections depicted in FIG. 3B include a local area network (LAN) 245 and a wide area network (WAN) 249, but may also include other networks. Such networking environments are commonplace in offices, enterprise-wide computer networks, intranets and the Internet.

When used in a LAN networking environment, the computer 241 is connected to the LAN 245 through a network interface or adapter 237. When used in a WAN networking environment, the computer 241 typically includes a modem 250 or other means for establishing communications over the WAN 249, such as the Internet. The modem 250, which may be internal or external, may be connected to the system bus 221 via the user input interface 236, or other appropriate mechanism. In a networked environment, program modules depicted relative to the computer 241, or portions thereof, may be stored in the remote memory storage device. By way of example, and not limitation, FIG. 3B illustrates remote application programs 248 as residing on memory device 247. It will be appreciated that the network connections shown are exemplary and other means of establishing a communications link between the computers may be used.

The computing environment 12 in conjunction with the capture device 20 may generate a computer model of a user's body position each frame. One example of such a pipeline which generates a skeletal model of one or more users in the field of view of capture device 20 is disclosed for example in U.S. patent application Ser. No. 12/876,418, entitled "System For Fast, Probabilistic Skeletal Tracking," filed Sep. 7, 2010, which application is incorporated by reference herein in its entirety.

The skeletal model may then be provided to the computing environment 12 such that the computing environment may track the skeletal model and render an avatar associated with the skeletal model. The computing environment may further determine which controls to perform in an application executing on the computer environment based on, for example, gestures of the user that have been recognized from the skeletal model. For example, as shown, in FIG. 2, the computing environment 12 may include a gesture recognition engine 190. The gesture recognition engine 190 is explained hereinafter, but may in general include a collection of gesture filters, each comprising information concerning a gesture that may be performed by the skeletal model (as the user moves).

The data captured by the cameras 26, 28 and device 20 in the form of the skeletal model and movements associated with it may be compared to the gesture filters in the gesture recognition engine 190 to identify when a user (as represented by the skeletal model) has performed one or more gestures. Those gestures may be associated with various controls of an application. Thus, the computing environment 12 may use the gesture recognition engine 190 to interpret movements of the skeletal model and to control an application based on the movements. For example, in the context of the present disclosure, the gesture recognition engine may recognize when a user is making a golf swing in a golf gaming application, and whether that swing is a practice swing or a swing intended to hit a golf ball.

Figure 4:
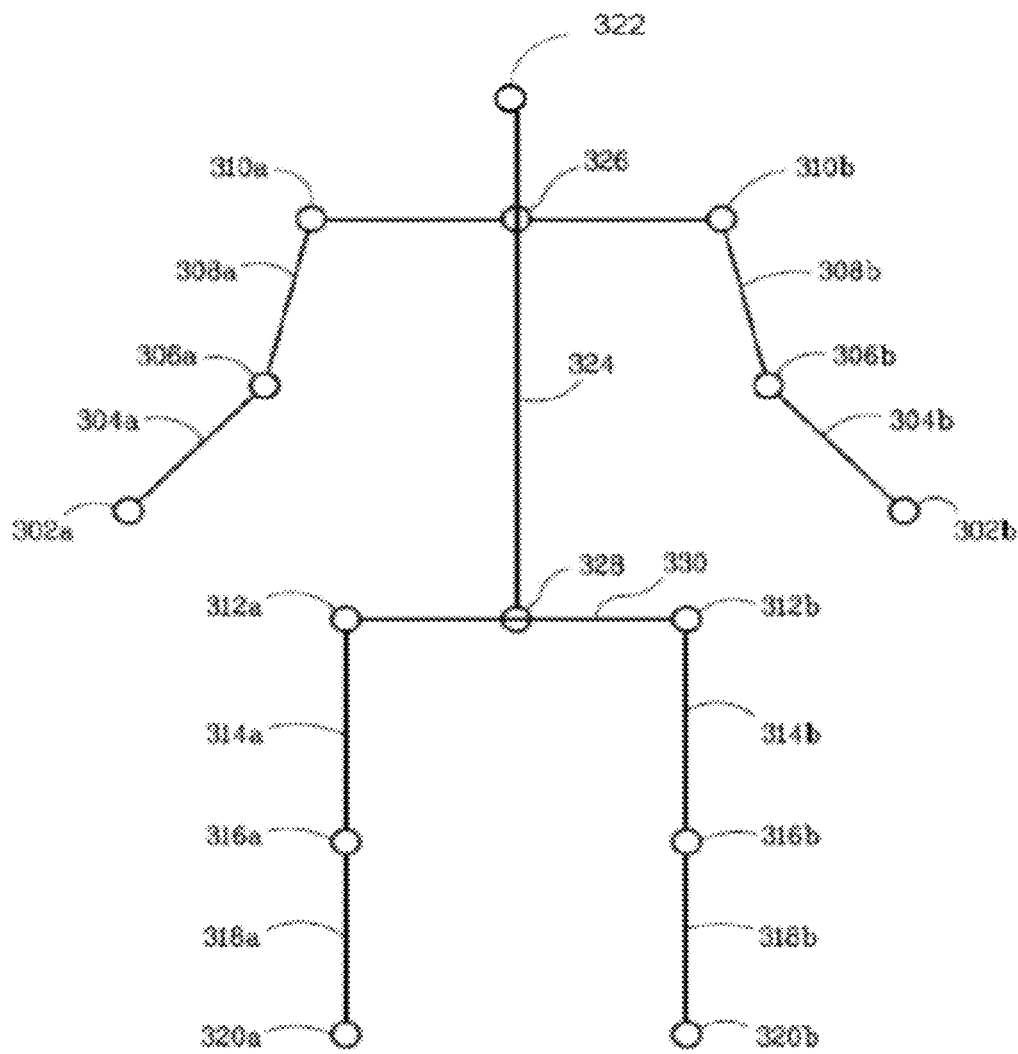
FIG. 4 illustrates a skeletal mapping of a user that has been generated from the target recognition, analysis, and tracking system of FIG. 2.

FIG. 4 depicts an example skeletal mapping of a user that may be generated from the capture device 20. In this embodiment, a variety of joints and bones are identified: each hand 302, each forearm 304, each elbow 306, each bicep 308, each shoulder 310, each hip 312, each thigh 314, each knee 316, each foreleg 318, each foot 320, the head 322, the mid spine 324, the top 326 and the bottom 328 of the spine, and the waist 330. Where more points are tracked, additional features may be identified, such as the bones and joints of the fingers or toes, or individual features of the face, such as the nose and eyes.

In general, the system 10 may be viewed as working with three frames of reference. The first frame of reference is the real world 3D space in which a user moves. The second frame of reference is the 3D game space, or machine space, in which the computing environment uses pose information and kinematic equations to define the 3D positions, velocities and accelerations of the user and virtual objects such as a golf ball created by the gaming or other application. And the third frame of reference is the 2D screen space in which the user's avatar and other objects such as a golf ball and golf course are rendered in the display. The computing environment CPU or graphics card processor converts the 3D machine space positions, velocities and accelerations of objects to 2D screen space positions, velocities and accelerations with which the objects are displayed on the audiovisual device 16.

Through moving and positioning his/her body in a given pose, a user may create gestures. A gesture may be evidenced by any of a variety of user positions and/or movements. As set forth above, examples include performing a swinging motion interpreted as a golf club swing, and whether the swing is a practice swing or a swing intended to strike a virtual golf ball.

Golf gaming applications are known and disclosed for example in U.S. Pat. No. 4,086,630, entitled, "Computer Type Golf Game Having Visible Fairway Display"; U.S. Pat. No. 6,217,444, entitled, "Simulative Golf Game System And A Method For Providing A Simulative Golf Game And A Storage Medium For Storing A Simulative Golf Game Program"; U.S. Pat. No. 7,549,918, entitled, "Golf Game System And Method Thereof"; U.S. Patent Publication No. 2007/0184884, entitled, "Game Device, Golf Game Device Shot Result Decision Method," each of which are incorporated by reference herein in their entirety.

However, in general, when a user performs a swinging motion interpreted as a golf swing gesture by the gaming application, the avatar 19 swings a virtual golf club and strikes a virtual golf ball. The golf ball then takes flight, the path of which is determined by the ball flight determination engine 192 based on a number of factors. The system of the present disclosure relates to showing the flight path resulting from a practice swing; that is, the flight path a golf ball would have taken if a practice swing was instead a real swing. This is referred to herein as a practice shot ball flight. The ball flight determination engine 192 may operate in the same manner, regardless of whether it is determining the flight of a ball resulting from a real swing or a practice swing in accordance with the present disclosure.

Figure 5:
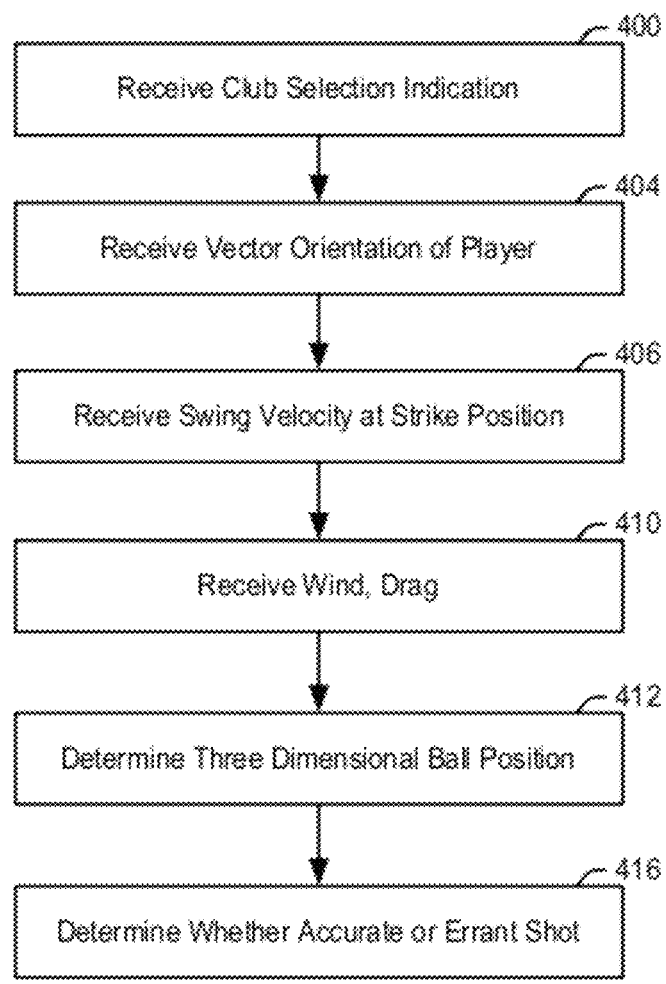
FIG. 5 is a flowchart of the operation of an embodiment of the ball flight determination engine according to the present disclosure.
Figure 6:
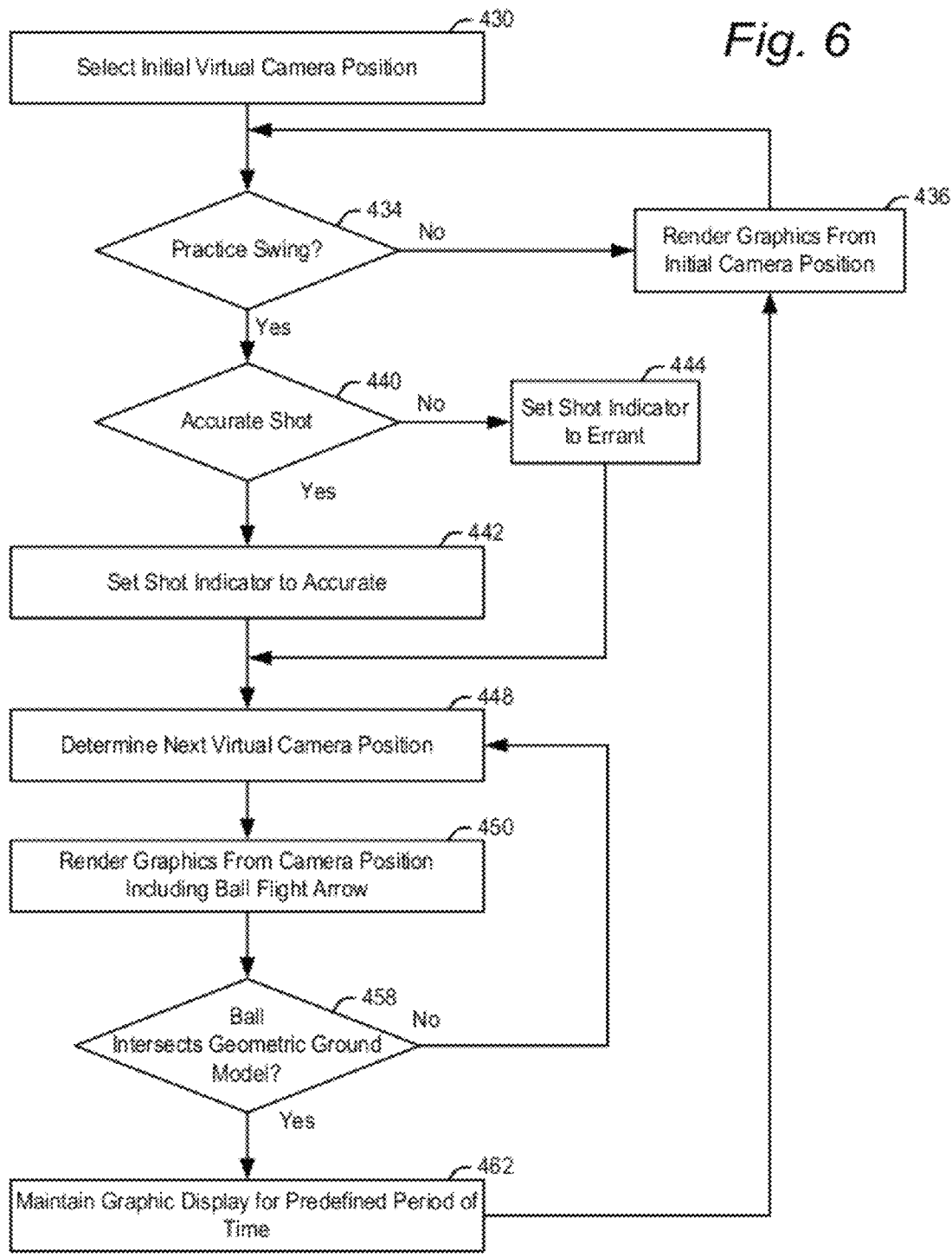
FIG. 6 is a flowchart of the operation of an embodiment of the virtual camera perspective engine according to the present disclosure.

The operation of ball flight determination engine 192 will now be explained with reference to the flowchart of FIG. 5. In step 400, the ball flight determination engine 192 receives indication of which club a user has selected for the next shot. Using various predefined gestures, a user may indicate to the golf gaming application which club the user would like for the next shot. Selection of a club will affect how far ball will travel when struck. A driver and low irons will result in a lower flight path over a longer distance, while higher irons will result in a higher flight path over a shorter distance. A putter will result in a ball rolling a given distance. In embodiments, selection of a particular club may establish a range of distances the virtual golf ball will travel on the virtual golf course when struck with that club selection. For example, a driver may travel between 200 and 250 yards on the virtual golf course. A 3-iron will travel 190-200 yards on the virtual golf course, and so on. These ranges may vary in different embodiments and may be set by the golf gaming application developer.

In step 404, the ball flight determination engine 192 receives a vector orientation of the user 18 relative to the capture device 20. This vector orientation may be returned by the skeletal model pipeline each frame. A player may orient his or her feet "square" to the capture device (along a vector A, FIG. 1C, along the z-axis out from the capture device). Such a square orientation will result in a golf shot which heads straight down the virtual fairway toward the virtual flag (ignoring other factors such as virtual wind). The virtual flag marks the virtual cup the player is trying to get the virtual ball into. A player may intentionally or unintentionally be rotated clockwise or counterclockwise from a square position. This will in turn result in the virtual golfer rotating and hitting a shot left or right of one that heads toward the flag. It is understood that player orientation with respect to a direction with which a shot is to be hit may be indicated and detected by methods other than orientation of the user's feet. One such example, the user may step from side to side in front of the screen to control where he is hitting the ball by adjusting their aim around the ball.

In step 406, the ball flight determination engine 192 may receive a swing velocity at the point of contact. This information may again come from the skeletal pipeline, which may for example track the change in position of the user's hands from one frame to the next.

In step 410, the ball flight determination engine 192 may receive a virtual wind direction and magnitude, as well as a coefficient of drag. These values may be built into the gaming application and may be selected at random or may be set with input from the user. The wind direction, magnitude and/or drag may be omitted from the determination may by the ball flight determination engine 192 in further embodiments.

From the above parameters, the ball flight determination engine 192 may determine a ball flight position at a given instant in time upon performance of a gesture recognized as a practice golf swing. In particular, selection of a golf club may set a range of distances and height the virtual ball is to travel, and the velocity of the swing may determine which distance in that range the virtual ball is to travel. The vector orientation may determine direction. In embodiments using wind and drag, those parameters may be used to alter the flight of a ball from its initial velocity and direction.

Using these parameters, the ball flight determination engine 192 is able to determine the position of the virtual golf ball in 3-D machine space. A starting x, y, and z position of the virtual golf ball is known in machine space. This will in part be determined by a geometric ground map plotting out the holes of the virtual golf course. Each frame, after a practice swing gesture, the ball flight determination engine 192 may determine a new position of a virtual golf ball in x, y, z machine space based on a flight of the virtual ball determined from the above parameters. Unlike a real golf swing which strikes and moves the virtual golf ball, the golf ball in fact stays stationary upon a practice swing. Thus, what is calculated is a position the virtual ball would be in if that same swing was performed as a real swing in the game. As indicated below, the position may be visually rendered using an arrow displayed on display 14.

From a given x, y, z position in machine space, the golf gaming application is able to identify a range of landing locations which will result in an "accurate" shot if the practice swing were a real swing. The golf gaming application may have fairways defined for each virtual golf hole in the geometry ground map. An accurate shot may be one that lands in the virtual fairway of the same hole, possibly (though not necessarily) closer to the hole. In further examples, an accurate shot need not land in the fairway, and may be more broadly defined as any shot that will improve the user's ability to complete the hole (get the virtual ball in the virtual hole) in a minimum number of strokes. Accurate landing locations may be predefined and stored in memory for the golf gaming application. In step 416, the ball flight determination engine 192 determines whether the practice shot ball flight results an accurate shot. If not, it is classified as an "errant shot." The use of the classification of a shot as an accurate or errant shot is explained below.

Gaming and other systems which render three-dimensional graphics from the perspective of a virtual camera are known and disclosed for example in U.S. Pat. No. 7,632,186, entitled, "Spectator Mode For A Game"; U.S. Pat. No. 7,884,823, entitled, "Three Dimensional Rendering Of Display Information Using Viewer Eye Coordinates"; U.S. Pat. No. 7,934,994, entitled, "Virtual Cameras And 3-D Gaming Environments In A Gaming Machine"; U.S. Pat. No. 7,918,730, entitled, "Trajectory-Based 3-D Games Of Chance For Video Gaming Machines"; and U.S. Pat. No. 7,753,785, entitled, "Game Apparatus, Storing Medium That Stores Control Program Of Virtual Camera, And Control Method Of Virtual Camera," each of which is incorporated by reference herein in their entirety. However, in general, the virtual camera perspective engine 194 for rendering graphics relating to a practice shot ball flight will now be described with reference to the flowchart of FIG. 6 and the screen illustrations of FIGS. 7-13.

In step 430, an initial virtual camera position is selected for displaying avatar 19, a virtual golf ball to be hit, and a virtual golf hole where the virtual ball is to be hit. The initial vantage point of the virtual camera may be arbitrarily selected to best show each of the avatar, ball and golf hole as indicated above.

In step 434, the virtual camera perspective engine 194 receives an indication as to whether a practice swing has been performed. This is detected by the gesture recognition engine described below, and may be indicated by user 18 providing a gesture indicating the swing is to be a practice instead of a real swing, and providing a gesture as in a swinging motion to indicate performance of a swing. It is understood that any of a variety of intuitive and arbitrary user motions may be used to indicate that a practice swing is being performed.

If no such practice swing gesture is detected, the GPU 108 renders the graphics of the avatar, virtual golf ball and virtual golf hole, as shown for example in FIG. 1C. On the other hand, if a practice swing is detected, the virtual camera perspective engine 194 next checks in step 440 whether the practice swing ball flight results in an accurate shot as described above. If so, a shot indicator is set to accurate in step 442. If not, the shot indicator is set to errant in step 444. This information is used as described below.

In step 448, the virtual camera perspective engine 194 next determines the virtual camera position. In particular, as the practice swing ball flight is shown on the display 14, that flight is not displayed from a static camera perspective. Instead, in embodiments, the camera perspective appears to change over the course of the practice swing ball flight to follow the ball flight path. In an alternative embodiment, the camera position may remain static as the practice swing ball flight is shown, and step 448 may be skipped.

Figure 7:
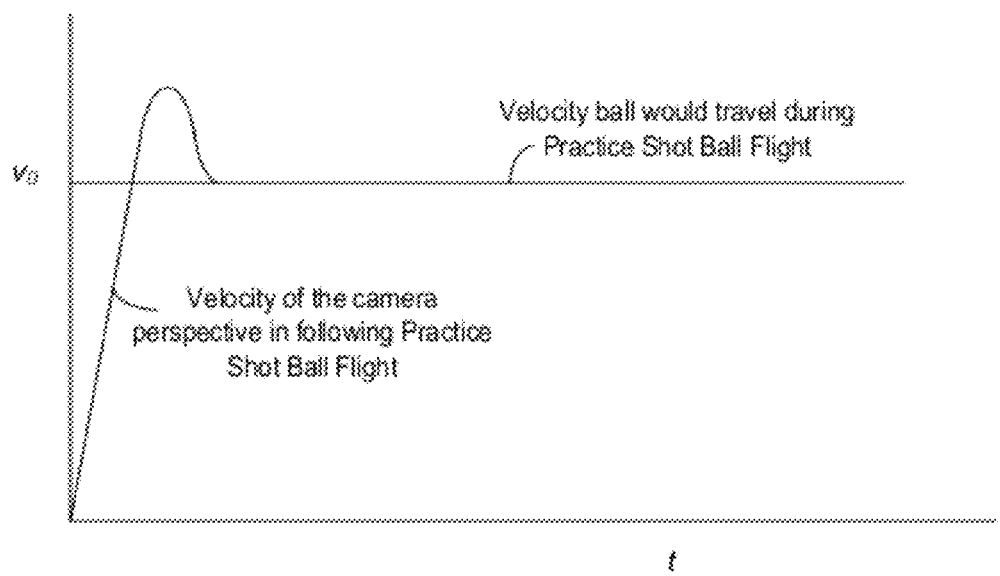
FIG. 7 is a graph of the relative velocities of the virtual camera and the progress of a practice swing ball flight over time.
Figure 8:
FIGS. 8-14 are different illustrations showing views of practice shot ball flights.
Figure 9:
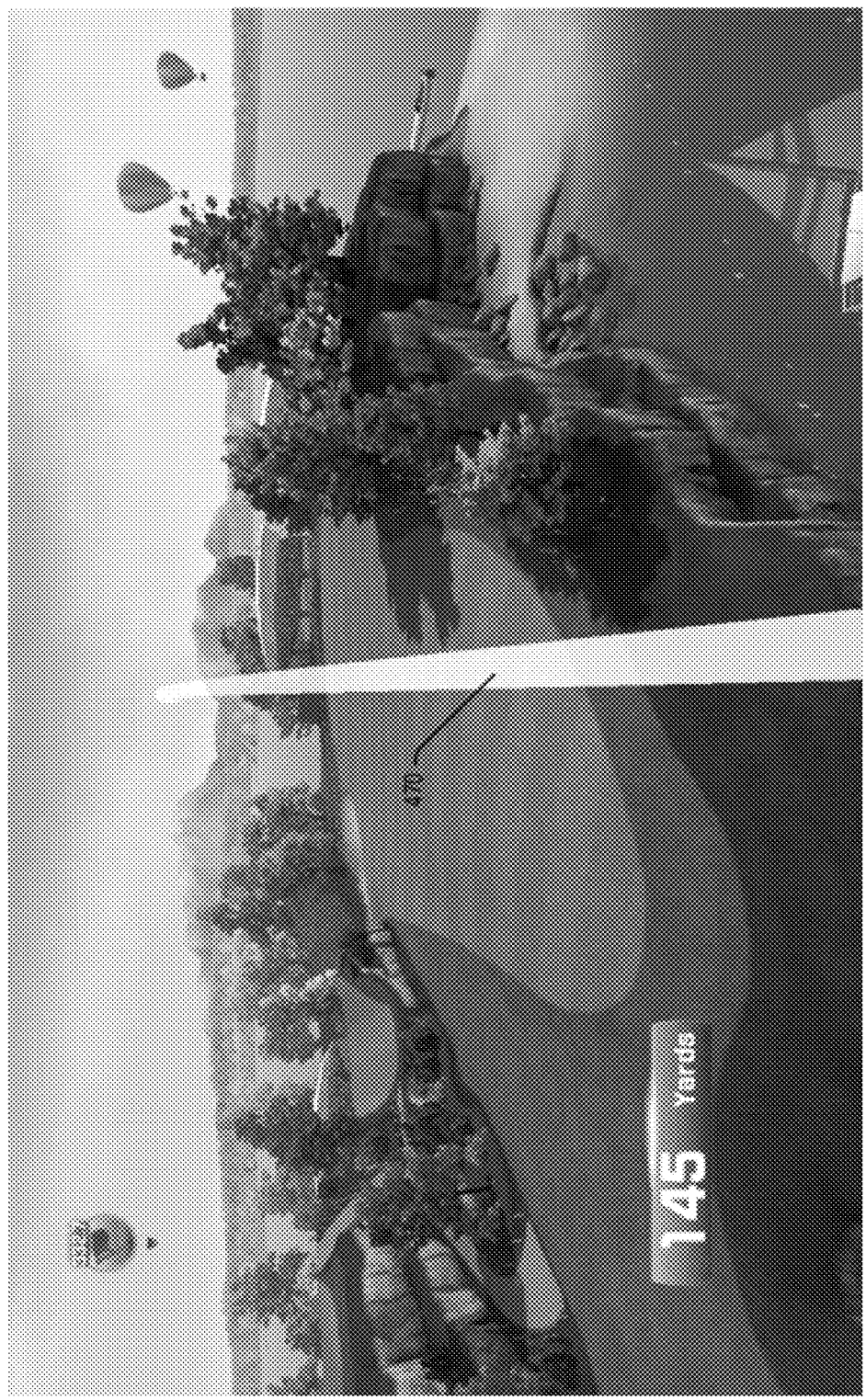
Figure 10:
Figure 11:
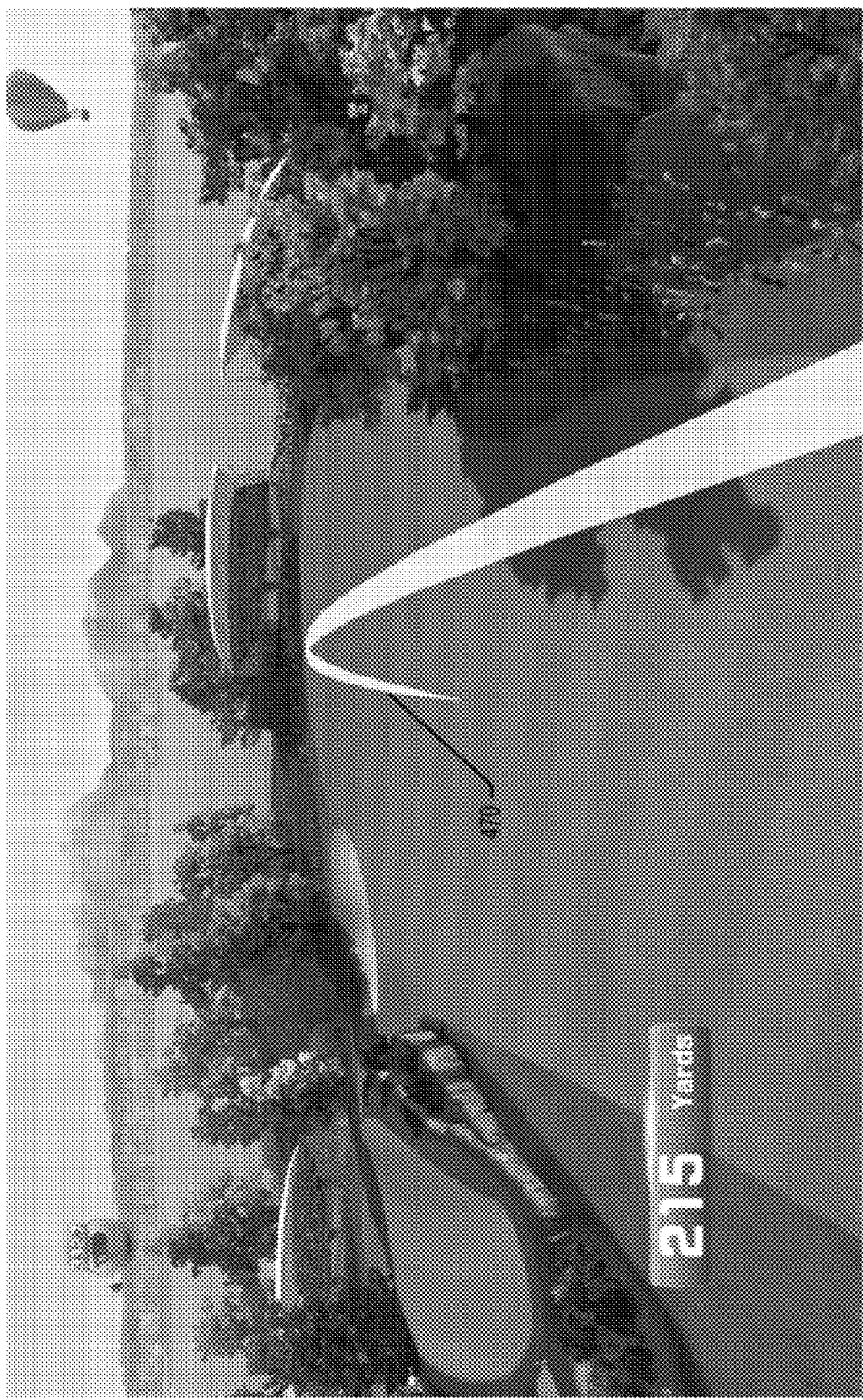

The camera perspective may be made to change according to a variety of linear and non-linear kinematic formulas based on the ball flight. FIG. 7 shows a single, non-limiting example. The ball flight goes nearly instantaneously from 0 to some velocity $v_0$ as would happen when a ball at rest is struck by a golf club. In embodiments, the velocity of the virtual camera speeds up rapidly (though not as quickly as the ball flight). In order to catch up to the ball flight and follow at a constant distance, the velocity of the virtual camera may exceed the velocity of the ball flight for a time, and then decrease once caught up to the current position of the ball flight.

In general, the virtual camera may be made to follow a path similar to that of the practice swing ball flight, but offset a little behind and rotated slightly to the side (for example 5°) to give some perspective of the ball flight. It is understood that the camera perspective may be made to change in a wide variety of paths with respect to the ball flight path. The practice swing ball flight may also be rotated slightly (again, for example 5°) to provide greater perspective of the ball flight. The virtual camera may follow the current position of the practice swing ball flight from either side, in front or behind, and with any angular offset. The virtual camera may provide an overhead view of the practice swing ball flight. As a further alternative, the virtual camera may provide a view from the end of the practice swing ball flight, looking back (so that the practice swing ball flight is shown approaching the virtual camera). The position of the camera perspective is determined in x, y, z machine space as the ball flight path is.

In step 450, the CPU 108 renders a graphic showing the practice swing ball flight and that portion of the virtual golf course within the field of view. Examples of the camera perspective showing the practice swing ball flight are shown in the illustrations of FIGS. 8-12. Known transformation matrices may be used to convert the 3-D machine space position of the virtual camera and progress of the practice swing ball flight into a 2-D rendering. An example of such matrices are described for example in U.S. Pat. No. 7,680,301, entitled, "Measurements Using a Single Image," which patent is incorporated by reference herein in its entirety.

As shown, the progress of the ball flight may be displayed by an arrow 470 which follows the ball flight. The front end of the arrow may advance over the course of the practice swing ball flight to show the progress of where the golf ball would be at a given instant during the flight. The arrow may be provided in a wide variety of styles. In order to add the arrow, pixels along the ball flight may be identified and may be altered to add a graphic. Additionally, to give the graphic some thickness and to enhance the visibility of the added graphic, pixels within a given radius of each identified pixel may also be altered in the same manner. The process of altering pixels to add or blend a graphic to video is known and described for example in U.S. Pat. No. 6,229,550 entitled, "Blending a Graphic," which patent is incorporated by reference herein in its entirety.

Figure 12:
Figure 13:
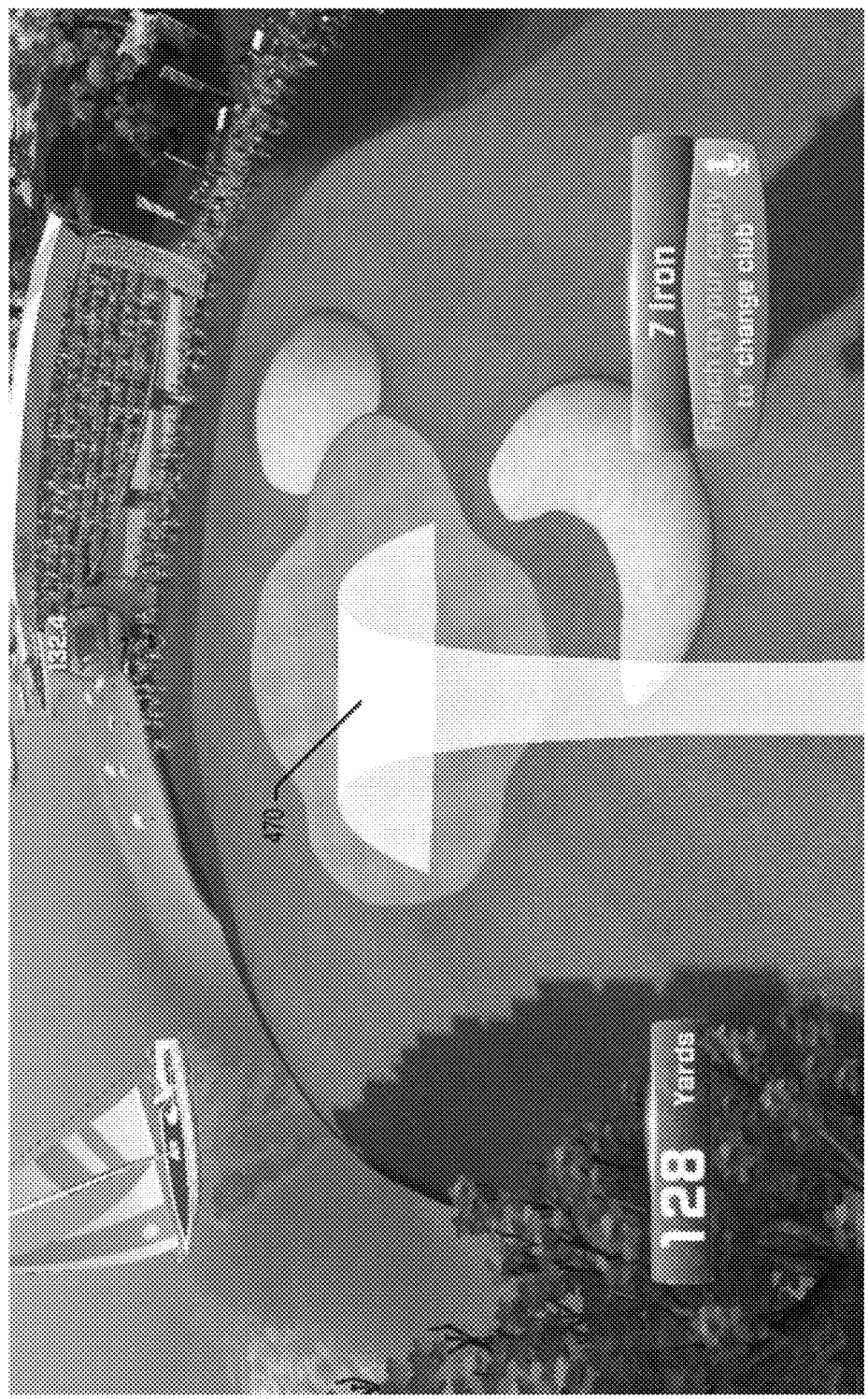

In embodiments, the arrow 470 may have a different appearance, depending on whether the shot is classified as an accurate shot or an errant shot, as described above in steps 440-444. For example, an accurate shot may be shown in white, as in FIGS. 8-12. An errant shot may be indicated by some other color, such as red. Audio files may be played, and may vary depending on whether the shot is an accurate or errant shot. If accurate, the audio file may be words of encouragement and congratulations. If errant, the audio file may be words indicating a bad result and prompting the user to try again. Other appearances of the arrow and other examples audio files may be played based on whether the shot is accurate or errant. In a further embodiment, an errant shot may be displayed as a fan, showing a variety of possible outcomes of the shot. Such an example is shown in FIG. 13.

In step 458, the virtual camera perspective engine 194 checks whether the ball traveling along the displayed ball flight intersects with the geometric ground model. That is, it checks in step 458 whether the ball has landed, as shown in FIG. 12. In embodiments, the ball flight ends upon landing and bounces of the ball are not shown. Bounces may be shown in further embodiments. If a ball traveling along the displayed ball flight has not intersected the geometric ground model in step 458, the virtual camera perspective engine 194 returns to step 448. The next camera position is determined and the next position of the ball flight path and camera position are again rendered. In this way, a continuous trajectory of the practice swing ball flight is shown.

On the other hand, if it is determined in step 458 that the ball has landed, that display may be maintained for a predetermined period of time (a second to a few seconds) in step 462 to linger at that location. Then the virtual camera perspective engine 194 may return to step 346 and the GPU 108 may again render the initial camera position where the avatar and golf ball are.

Figure 14:
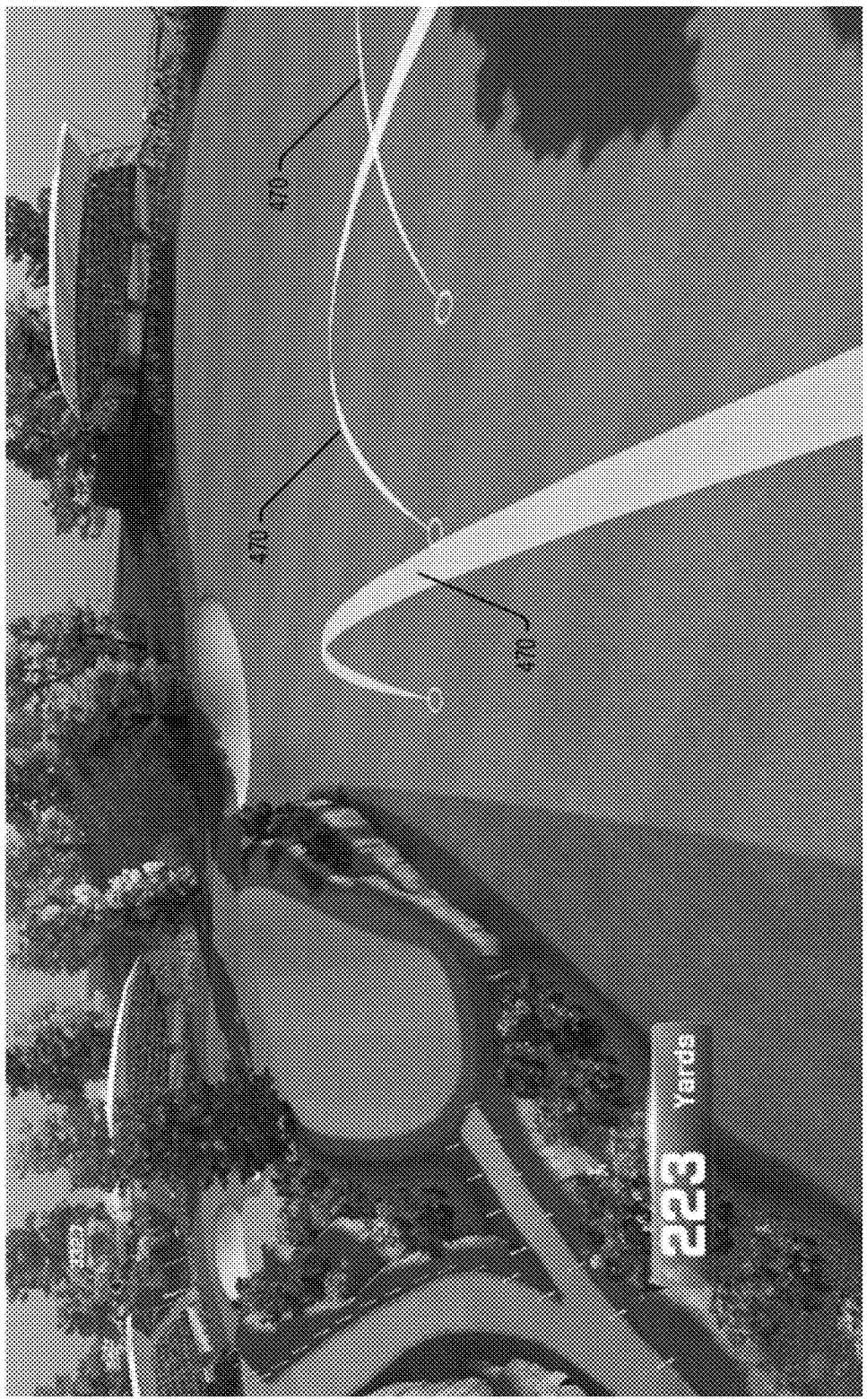
Figure 15:
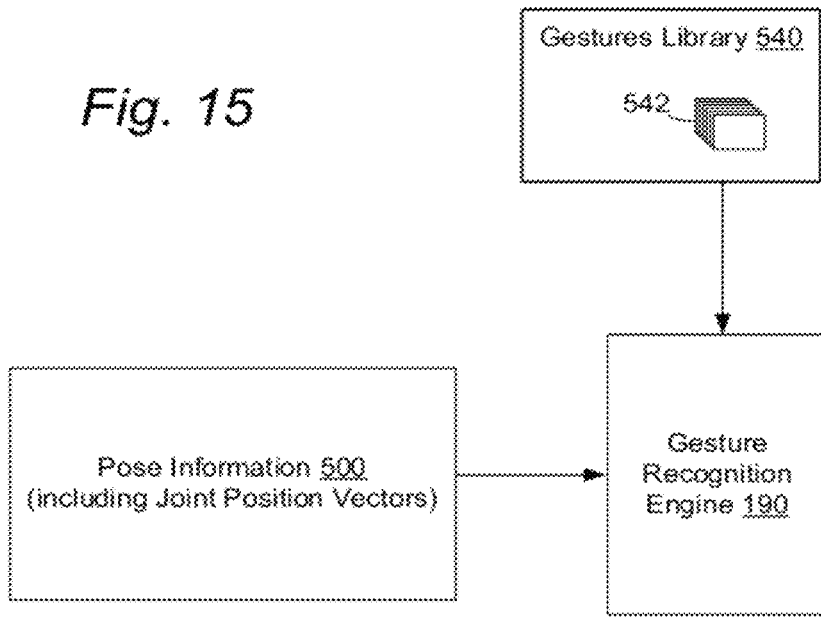
FIG. 15 is a block diagram showing a gesture recognition engine for determining whether pose information matches a stored gesture.
Figure 16:
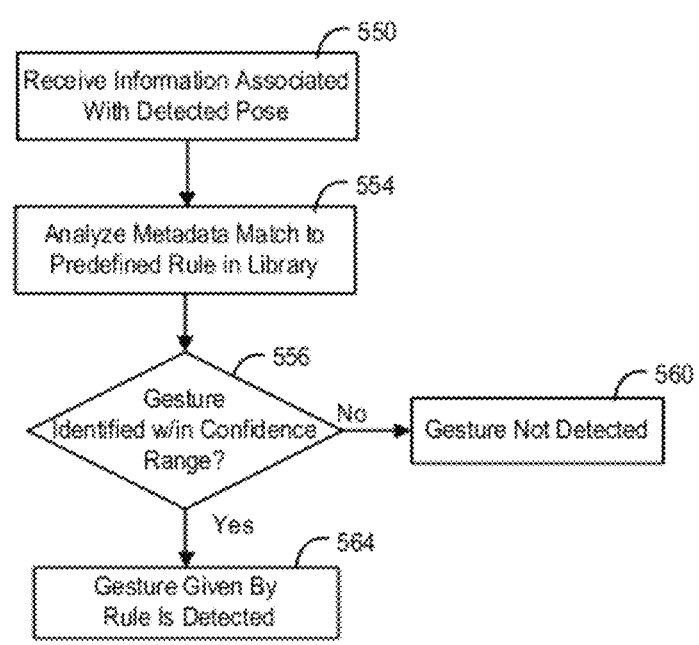
FIG. 16 is a flowchart showing the operation of the gesture recognition engine.

It may happen while a practice swing ball flight is being displayed that the user 18 in real world space takes another practice swing. In this event, the ball flight determination engine 192 and the virtual camera perspective engine 194 may identify and track the positions of a second practice swing ball flight and a second virtual camera over time. However, the system continues to display the first practice swing ball flight from the perspective of the first virtual camera to completion. Once completed, the system may then switch to the ball traveling along the second practice swing ball flight from the perspective of the second virtual camera, picking it up mid way through its flight. A third, fourth, etc., practice swing may be tracked in the same manner Upon displaying a second or subsequent practice swing ball flight to completion, the system may display all prior practice swing ball flights that were being shown when the second or subsequent practice swing started. This example is shown in FIG. 14.

As noted, in order to perform a practice swing to generate the view of the resulting practice swing ball flight, the user 18 may perform a gesture recognized as a practice golf swing. Those of skill in the art will understand a variety of methods of analyzing user body movements and position to determine whether the movements/position conform to a predefined gesture. Such methods are disclosed for example in the above incorporated application Ser. No. 12/475,308, as well as U.S. Patent Application Publication No. 2009/0074248, entitled "Gesture-Controlled Interfaces For Self-Service Machines And Other Applications," which publication is incorporated by reference herein in its entirety. However, in general, user positions and movements are detected by the capture device 20. From this data, joint position vectors may be determined The joint position vectors may then passed to the gesture recognition engine 190, together with other pose information. The operation of gesture recognition engine 190 is explained in greater detail with reference to the block diagram of FIG. 15 and the flowchart of FIG. 16.

The gesture recognition engine 190 receives pose information 500 in step 550. The pose information may include a great many parameters in addition to joint position vectors. Such additional parameters may include the x, y and z minimum and maximum image plane positions detected by the capture device 20. The parameters may also include a measurement on a per-joint basis of the velocity and acceleration for discrete time intervals. Thus, in embodiments, the gesture recognition engine 190 can receive a full picture of the position and kinetic activity of all points in the user's body.

The gesture recognition engine 190 analyzes the received pose information 500 in step 554 to see if the pose information matches any predefined rule 542 stored within a gestures library 540. A stored rule 542 describes when particular positions and/or kinetic motions indicated by the pose information 500 are to be interpreted as a predefined gesture. In embodiments, each gesture may have a different, unique rule or set of rules 542. Each rule may have a number of parameters (joint position vectors, maximum/minimum position, change in position, etc.) for one or more of the body parts shown in FIG. 4. A stored rule may define, for each parameter and for each body part 302 through 330 shown in FIG. 4, a single value, a range of values, a maximum value, a minimum value or an indication that a parameter for that body part is not relevant to the determination of the gesture covered by the rule. Rules may be created by a game author, by a host of the gaming platform or by users themselves.

The gesture recognition engine 190 may output both an identified gesture and a confidence level which corresponds to the likelihood that the user's position/movement corresponds to that gesture. In particular, in addition to defining the parameters required for a gesture, a rule may further include a threshold confidence level required before pose information 500 is to be interpreted as a gesture. Some gestures may have more impact as system commands or gaming instructions, and as such, require a higher confidence level before a pose is interpreted as that gesture. The comparison of the pose information against the stored parameters for a rule results in a cumulative confidence level as to whether the pose information indicates a gesture.

Once a confidence level has been determined as to whether a given pose or motion satisfies a given gesture rule, the gesture recognition engine 190 then determines in step 556 whether the confidence level is above a predetermined threshold for the rule under consideration. The threshold confidence level may be stored in association with the rule under consideration. If the confidence level is below the threshold, no gesture is detected (step 560) and no action is taken. On the other hand, if the confidence level is above the threshold, the user's motion is determined to satisfy the gesture rule under consideration, and the gesture recognition engine 190 returns the identified gesture.

Given the above disclosure, it will be appreciated that a great many gestures may be identified using joint position vectors. As one of many examples, the user may lift and drop each leg 312-320 to mimic walking without moving.

The foregoing detailed description of the inventive system has been presented for purposes of illustration and description. It is not intended to be exhaustive or to limit the inventive system to the precise form disclosed. Many modifications and variations are possible in light of the above teaching. The described embodiments were chosen in order to best explain the principles of the inventive system and its practical application to thereby enable others skilled in the art to best utilize the inventive system in various embodiments and with various modifications as are suited to the particular use contemplated. It is intended that the scope of the inventive system be defined by the claims appended hereto.

What is claimed:

1. A method for presenting a practice swing ball flight on a display in a video gaming application, comprising:
   (a) receiving an indication of a first, practice swing to advance a virtual ball from a first virtual position to a second virtual position, the practice swing not advancing the virtual ball from the first virtual position to the second virtual position;
(b) determining a ball flight of the virtual ball as if the swing performed in said step (a) were not a practice swing but instead was a swing advancing the virtual ball, the step (b) of determining ball flight using characteristics of the practice swing performed in said step (a);
(c) determining a position of a virtual camera for displaying the ball flight determined in said step (b);
(d) displaying the ball flight determined in said step (b) on the display from a perspective of the virtual camera;
(e) receiving an indication of a second swing advancing the virtual ball from the first virtual position toward the second virtual position; and
(f) advancing a location of the virtual ball from the first virtual position toward the second virtual position based on the second swing performed in said step (e).

2. The method of claim 1, wherein said step (a) comprises the step of receiving an indication of a virtual golf club with which the practice swing is to be made and a vector orientation of a user's feet relative to an image capture device.

3. The method of claim 2, wherein said step (a) further comprises the step of receiving an indication of velocity of a user's swing.

4. The method of claim 1, wherein the system for presenting a practice swing ball flight is a system for presenting a practice golf swing ball flight.

5. The method of claim 4, further comprising the step of determining whether the practice swing would result in an accurate shot, wherein an accurate shot is defined as a shot which improves a user's ability to complete a virtual golf hole in a minimum number of golf swings.

6. A method for presenting a practice swing ball flight on a display in a golf video gaming application, comprising:
a) receiving a predefined gesture from a user indicative of a practice golf swing via a natural user interface;
b) receiving an indication of a first, practice swing to advance a virtual ball from a first virtual position to a second virtual position, the practice swing not advancing the virtual ball from the first virtual position to the second virtual position;
c) determining a ball flight of a virtual ball struck with the practice swing performed in said step b);
d) varying the perspective of a virtual camera to follow the practice swing ball flight of the virtual ball struck with the practice swing;
e) determining a position of a virtual camera for displaying the ball flight;
f) displaying the practice swing ball flight struck with the practice swing performed in said step b) on the display from a perspective of the virtual camera;
g) receiving an indication of a second swing advancing the virtual ball from the first virtual position toward the second virtual position; and
h) advancing a location of the virtual ball from the first virtual position toward the second virtual position based on the second swing performed in said step h).

7. The method of claim 6, wherein the practice golf swing comprises a first practice golf swing, the method further comprising the step of receiving a second predefined gesture from the user indicative of a second practice golf swing as the display is displaying the practice swing ball flight from the first practice golf swing.

8. The method of claim 7, further comprising the step of displaying the practice swing ball flight from the first practice golf swing to a point where the virtual golf ball intersects with geometric ground map of the virtual golf course, and then displaying a remaining portion of the practice swing ball flight from the second practice golf swing.

9. The method of claim 7, further comprising the step of displaying the practice swing ball flight from the second practice golf swing upon receiving the second predefined gesture.

10. The method of claim 6, further comprising the step of providing an indication of whether the practice golf swing would have resulted in an accurate golf shot if the user had used that swing to strike the virtual golf ball.

11. The method of claim 10, wherein an accurate golf shot is indicated when it is determined that the practice swing results in a golf shot where the virtual ball lands in a virtual fairway.

12. The method of claim 6, wherein said step (b) comprises the step of receiving an indication of a virtual golf club with which the practice swing is to be made, a vector orientation of a user's feet relative to an image capture device and an indication of velocity of a user's swing.

13. The method of claim 6, wherein said step (b) further comprises the step of receiving an indication of wind velocity and direction.

14. The method of claim 6, wherein said step © comprises the step of varying a perspective of the virtual camera to initially be slower than the velocity of the virtual struck golf ball and then increasing a velocity of the virtual camera to a point where the virtual camera catches up to the virtual struck golf ball.

15. A method for presenting a practice swing ball flight on a display in a golf video gaming application, comprising:
a) receiving a first predefined gesture from a user indicative of a practice golf swing via a natural user interface of a virtual golf ball located at a virtual position;
b) determining a first ball flight of a virtual ball as if it were struck with the practice swing performed by a user;
c) determining a position of a virtual camera for displaying the first ball flight;
d) displaying the practice swing ball flight on the display from a perspective of the virtual camera;
e) receiving a second predefined gesture from a user indicative of an actual golf swing intended to strike the virtual golf ball via the natural user interface of the virtual golf ball at the same virtual position as in said step a);
f) determining a second ball flight of the virtual ball struck with the actual swing performed by the user;
g) determining a position of a virtual camera for displaying the second ball flight;
h) displaying the ball flight on the display resulting from the actual golf swing from a perspective of the virtual camera.

16. The method of claim 15, wherein the step of displaying the practice swing ball flight on the display from a perspective of the virtual camera comprises the step of displaying an arrow tracking the flight of the virtual golf ball if struck with the practice golf swing.

17. The method of claim 15, wherein the practice golf swing comprises a first practice golf swing, the method further comprising the step of receiving a third predefined gesture from the user indicative of a second practice golf swing as the display is displaying the practice swing ball flight from the first practice golf swing.

18. The method of claim 17, further comprising the step of displaying the practice swing ball flight from the first practice golf swing to a point where the virtual golf ball intersects with geometric ground map of the virtual golf course, and then displaying a remaining portion of the practice swing ball flight from the second practice golf swing.

19. The method of claim 18, further comprising the step of displaying landing positions simultaneously on the display resulting from the first and second practice swings.

20. The method of claim 15, further comprising the step of providing an indication of whether the practice golf swing would have resulted in a virtual golf shot landing within the boundaries for the golf hole then being played by the user in the virtual golf game.

* * * * *